(12) United States Patent
Tadokoro et al.

(10) Patent No.: US 7,670,517 B2
(45) Date of Patent: Mar. 2, 2010

(54) METHOD OF PRODUCING POLYURETHANE FOAM SHEET AND LAMINATED SHEET USING SAME

(75) Inventors: Shigeru Tadokoro, Osaka (JP); Yoshinori Kanagawa, Osaka (JP); Toshio Niwa, Osaka (JP); Toshifumi Tamaki, Osaka (JP)

(73) Assignees: Kahei Co., Ltd., Sennan-Shi (JP); Dainippon Ink and Chemicals, Inc., Tokyo (JP)

( * ) Notice: Subject to any disclaimer, the term of this patent is extended or adjusted under 35 U.S.C. 154(b) by 1071 days.

(21) Appl. No.: 10/540,027

(22) PCT Filed: Dec. 22, 2003

(86) PCT No.: PCT/JP03/16476
§ 371 (c)(1),
(2), (4) Date: Jun. 22, 2005

(87) PCT Pub. No.: WO2004/060655
PCT Pub. Date: Jul. 22, 2004

(65) Prior Publication Data
US 2006/0079589 A1 Apr. 13, 2006

(30) Foreign Application Priority Data
Dec. 27, 2002 (JP) ............................. 2002-379816

(51) Int. Cl.
*B32B 37/00* (2006.01)
*B32B 27/00* (2006.01)
(52) U.S. Cl. .................. 264/45.5; 264/45.6; 264/45.9; 428/423.1

(58) Field of Classification Search ......... 428/423–424; 528/79–81; 524/44–85; 264/41–55
See application file for complete search history.

(56) References Cited

U.S. PATENT DOCUMENTS 3,311,527 A 3/1967 Urbanic et al. ............... 161/64

(Continued)

FOREIGN PATENT DOCUMENTS

GB 1364488 8/1974

(Continued)

OTHER PUBLICATIONS

European Search Report dated Dec. 13, 2005.

(Continued)

*Primary Examiner*—Steven P Griffin
*Assistant Examiner*—Jodi Cohen
(74) *Attorney, Agent, or Firm*—Kratz, Quintos & Hanson, LLP

(57) ABSTRACT

A method of producing a polyurethane foam sheet, and a laminated sheet that uses such a foam sheet, that can be applied to artificial leather, synthetic leather, and cushioning materials used in all manner of applications. A polyurethane foam sheet is produced by applying a liquid mixture, obtained by mixing together a heated and melted hot melt urethane prepolymer (A) containing isocyanate groups at molecular terminals, and a compound (B) containing at least 2 active hydrogen atom-containing groups, onto a substrate in a sheet-like manner, and then water foaming the liquid mixture by bringing the sheet-like liquid mixture into contact with water vapor or moisture (water). A laminated sheet is produced by bonding a third substrate to the polyurethane foam sheet.

30 Claims, 4 Drawing Sheets

U.S. PATENT DOCUMENTS

| | | | |
|---|---|---|---|
| 3,639,145 A | 2/1972 | Fujita et al. | 117/62 |
| 3,694,301 A | 9/1972 | Gruenewald et al. | 161/159 |
| 3,770,481 A | 11/1973 | Canat | 117/10 |
| 3,959,049 A | 5/1976 | Tanaka et al. | 156/79 |
| 4,419,457 A * | 12/1983 | Tokunaga | 521/65 |
| 5,527,616 A * | 6/1996 | Hatano et al. | 428/423.1 |

FOREIGN PATENT DOCUMENTS

| | | |
|---|---|---|
| JP | 53-8664 | 1/1978 |
| JP | 53-74573 | 7/1978 |
| JP | 10-310624 | 11/1998 |
| JP | 11-246695 | 9/1999 |
| JP | 2001-2752 | 1/2001 |
| JP | 2002-249534 | 9/2002 |
| JP | 2002-348347 | 12/2002 |
| JP | 2003-277459 | 10/2003 |
| WO | WO 01/64767 | 9/2001 |
| WO | WO 03/042271 | 5/2003 |

OTHER PUBLICATIONS

A. Farkas, et al.; "The Catalytic Effects of 1,4-Diaza[2.2.2]bicyclooctane for Isocyanate Reactions;" *J. Am. Chem. Soc.*; vol. 82;1960; pp. 642-643/Discussed in the specification.

* cited by examiner

METHOD OF PRODUCING POLYURETHANE FOAM SHEET AND LAMINATED SHEET USING SAME

TECHNICAL FIELD

The present invention relates to a method of producing a polyurethane foam sheet that can be applied to artificial leather, synthetic leather, and cushioning materials used in all manner of applications, and also relates to a method of producing a laminated sheet using such a polyurethane foam sheet.

Priority is claimed on Japanese Patent Application No. 2002-379816, the content of which is incorporated herein by reference.

BACKGROUND ART

Polyurethane foam sheets, and particularly polyurethane foam sheets produced using so-called flexible polyurethane as a raw material, exhibit excellent flexibility, elasticity, and cushioning characteristics, and are consequently used, in combination with various fabrics, in a variety of different applications such as clothing, boots, and supporters and the like. In conventional methods of producing these polyurethane foam sheets, a low boiling point organic solvent such as a chlorofluorocarbon (such as CFC-11 or CFC-113) or methylene chloride has typically been used as the foaming agent. However, in recent years, the toxicity of these organic solvents, together with environmental concerns, have resulted in ongoing restrictions or even prohibition of the production and usage of these solvents, and there is now a pressing need for a shift to a method of producing polyurethane foam sheets that does not require the use of such organic solvents.

Furthermore, in the present invention, the term laminated sheet refers to a sheet with a laminated structure including an aforementioned polyurethane foam sheet, as well as a nonwoven fabric, a woven fabric, or a knitted fabric or the like, and artificial leather and synthetic leather are typical examples. Polyurethane resins have conventionally been widely used within artificial leather and synthetic leather applications, and generally, these artificial or synthetic leathers employ a laminated structure that includes a foam layer (a porous layer) containing a polyurethane resin, which is used for imparting a leather-like texture.

"Artificial leather" is generally produced by a so-called wet process, wherein a dimethylformamide (hereafter also referred to as DMF) solution of a polyurethane resin composition is impregnated into, or coated onto, a nonwoven fabric, the polyurethane is then solidified within a water coagulation bath or a coagulation bath of a mixture of DMF and water, thereby forming a foam layer (a porous layer), and the fabric then passes through a washing step and a drying step.

Furthermore, "synthetic leather" is generally produced by the same wet process as that described above for "artificial leather", with the exception of using a woven fabric or knitted fabric instead of the nonwoven fabric. Synthetic leather can also be produced by a so-called dry process, although this process also requires the use of a large quantity of organic solvent, and in this regard, differs little from the wet process.

In all of the above conventional methods of producing artificial leather and synthetic leather, an organic solvent-based polyurethane resin is used, and because the production process inevitably requires the drying or extraction of the organic solvent, a variety of problems arise, such as the deleterious impact on human health, environmental contamination, and the energy requirements associated with evaporating the organic solvent. Accordingly, the industry is now strongly demanding a shift from organic solvent-based resins to either water-based polyurethane resins or solvent-free polyurethane resins, and a shift to production methods that do not require the use of organic solvents.

For example, investigations into the use of water-based polyurethane resins instead of organic solvent-based polyurethane resins are already being conducted, but because the resulting polyurethane foam sheets, and laminated sheets of artificial leather or synthetic leather exhibit inferior water resistance and durability, their applicability is extremely limited.

Furthermore, a method of producing a foamed polyurethane elastomer sheet, wherein a prepolymer containing isocyanate groups at the terminals is mixed with 2-pyrrolidone, the resulting mixture is formed into a sheet, and the sheet-like mixture is then foamed and cured by contact treatment with steam has already been disclosed (see Japanese Unexamined Patent Application, First Publication No. Hei 11-246695 (page 3, left column, paragraph 0016 to page 4, right column, paragraph 0025)).

The prepolymer containing isocyanate groups at the terminals disclosed specifically within the above application is liquid at room temperature, and undergoes a cross-linking reaction with moisture (water) to form a solid, although if not mixed with 2-pyrrolidone, the prepolymer undergoes almost no foaming even in contact with steam, and it is only upon mixing with 2-pyrrolidone that a favorable level of foaming is achieved. Accordingly, the resulting foamed polyurethane elastomer contains residual organic solvent, namely the 2-pyrrolidone, within the elastomer, and can therefore not be considered solvent-free.

In addition, the above sheet-like mixture of the prepolymer and 2-pyrrolidone disclosed specifically within the above application is of low viscosity, and remains of low viscosity even after foaming by contact treatment with steam, meaning the foam shape is difficult to stabilize. Furthermore, because the progression of the subsequent cross-linking reaction caused by reaction with atmospheric moisture requires considerable time, and the viscosity increase of the above sheet-like mixture is inadequate, meaning the cohesive force is poor, when the foamed polyurethane elastomer sheet is wound into a roll or the like, the stress applied to the sheet can cause deformation or even collapse of the foam shape.

Moreover, when the foamed polyurethane elastomer sheet is laminated to another substrate to form a laminated sheet, components of the above mixture can penetrate into the other substrate, causing the texture of the resulting laminated sheet to become overly hard.

Techniques involving reactive hot melts are also being investigated as potential methods of producing polyurethane foam sheets and laminated sheets using solvent-free polyurethane resins. These reactive hot melts are solids at room temperature, but melt to form a liquid under heating, and combine a "hot melt property", wherein the cohesive force is restored on cooling, with favorable "moisture curability", wherein a cross-linking reaction caused by a reaction between isocyanate groups and moisture (water) ensures excellent levels of adhesion and durability (and particularly resistance to hydrolysis and heat). In recent years, reactive hot melts have been attracting considerable attention in a variety of fields as a potential method for removing the need for solvents.

For example, a method of producing a polyurethane porous sheet-like structure, wherein an isocyanate group-containing urethane prepolymer, which is either a semisolid or solid at room temperature but has been melted by heating, a compound capable of reaction with an isocyanate group, which is either heated or at room temperature, and/or a urethane curing catalyst are subjected to high-speed mixing while a gas is introduced to effect mechanical foaming, and the resulting foamed product is then spread out into a sheet-like structure has already been disclosed (see Japanese Unexamined Patent Application, First Publication No. 2002-249534 (page 3, left column, paragraph 0007 to page 5, right column, paragraph 0037)).

Using this method, polyurethane foam sheets and laminated sheets of a certain degree of thickness can be produced via a production process that requires no discharge of organic solvents into the environment, and also enables considerable energy conservation.

However, in those cases where the applied thickness of the sheet-like foam product is relatively thin, namely, from 50 to approximately 200 μm, the foam shape generated by mechanical foaming tends to be non-uniform, and the foaming degree of the foam is extremely small. In addition, because the progression of the cross-linking reaction of the isocyanate groups requires considerable time, when the polyurethane porous sheet-like structure is wound into a roll or the like, the stress applied to the sheet can cause deformation or even collapse of the foam shape.

DISCLOSURE OF INVENTION

An object of the present invention is to provide a method of producing a polyurethane foam sheet, which uses no organic solvents that are harmful to people and the environment, and consequently requires no organic solvent drying step or extraction step, thus allowing a reduction in the energy consumption associated with evaporating and removing the solvent, and which even in the case of a comparatively thin foam sheet, enables easy control of the foam shape, and enables the production of a polyurethane foam sheet, and a laminated sheet containing the polyurethane foam sheet, that have uniform foam shape, a soft texture, good flexibility, and excellent mechanical strength and durability such as resistance to hydrolysis and heat.

In order to achieve the above object, the inventors of the present invention realized that in order to achieve the target polyurethane foam sheet, a suitable level of fluidity was required when processing the raw materials such as the polyurethane into a sheet-like form, whereas in order to ensure easy control of the foam shape of the foam sheet, enabling favorable uniformity of the foam shape, the raw material requires a suitable level of viscosity at the point where the raw material is foamed. Based on these observations, the inventors determined that a solvent-free hot melt urethane prepolymer containing isocyanate groups at the molecular terminals was ideal, and continued their investigations on this premise.

This hot melt urethane prepolymer is a solid at room temperature, but melts to form a liquid on heating, and has a property wherein the cohesive force is restored on cooling, and consequently, by heating and melting the urethane prepolymer, the material is imparted with a suitable level of fluidity, and can be processed into a sheet-like form.

Following processing into a sheet, the melted hot melt urethane prepolymer is cooled to a temperature that is in keeping with the atmospheric temperature of the production process, and this cooling causes an increase in viscosity. The viscosity can be adjusted to a viscosity that is ideal for promoting foaming via a cross-linking reaction between the isocyanate groups within the hot melt urethane prepolymer and the moisture (water) in the atmosphere.

Furthermore, the inventors discovered that conducting foaming after the hot melt urethane prepolymer had been processed into sheet form, particularly in those cases where a comparatively thin foam sheet of thickness 50 to 200 μm is to be formed, enables easy control of the foam shape, and enables the generation of a polyurethane foam sheet with a more uniform foam shape. As described above, a conventional method in which the hot melt urethane prepolymer is mechanically foamed prior to processing into a sheet is already known (see Japanese Unexamined Patent Application, First Publication No. 2002-249534). However, with this method, non-uniformity of the foam shape, and a difficulty in increasing the foaming degree can be problematic, particularly when the foam sheet is thin. By initiating foaming after the processing to generate a sheet, the inventors of the present invention were able to resolve these problems.

The inventors also discovered that in order to achieve foaming of the sheet-like, liquid hot melt urethane prepolymer, water foaming was an ideal method. The technical term "water foaming" used in the present invention is a common technique known by people skilled in the art, and refers to a technique in which foaming is achieved by bringing water vapor into contact with a urethane prepolymer containing isocyanate groups at the molecular terminals, thereby causing a reaction between the isocyanate groups and water to generate carbon dioxide gas, which causes the foaming.

By employing this water foaming technique, the liquid hot melt urethane prepolymer can be foamed favorably, and as the cross-linking reaction of the hot melt urethane prepolymer progresses due to the reaction between the isocyanate groups and water, the cohesive force and physical strength of the foamed urethane prepolymer can be increased rapidly. As a result, the inventors discovered that the generated foam could be stabilized more quickly, meaning the foam could be rapidly converted to a state in which it was resistant to shape deformation.

Moreover, the inventors also discovered that combining the hot melt urethane prepolymer containing isocyanate groups at the molecular terminals with a compound containing at least 2 active hydrogen atom-containing groups provided advantages in terms of improving the adjustment of the viscosity in the water foaming step, improving the speed with which the cohesive force and the physical strength increased as a result of the cross-linking reaction with the foamed urethane prepolymer, and improving the physical strength and durability of the produced polyurethane foam sheet. As a result, the speed with which the foam shape is stabilized, and the uniformity of the foam shape can be improved even further.

As a result of the above investigations, the inventors discovered that by forming a sheet from a liquid mixture obtained by mixing together a melted hot melt urethane prepolymer (A) containing isocyanate groups at the molecular terminals, and a compound (B) containing at least 2 active hydrogen atom-containing groups, and then bringing this sheet of the liquid mixture into contact with water vapor to cause water foaming of the liquid mixture, easy control of the foam shape was possible, even in the case of a comparatively thin foam sheet of thickness 50 to 200 μm, enabling the production of a polyurethane foam sheet, and a laminated sheet containing the polyurethane foam sheet, with uniform foam shape, a soft texture, and excellent mechanical strength and durability such as resistance to hydrolysis and heat.

In addition, the inventors discovered that with this production method, the physical strength of the generated polyurethane foam sheet increases at an early stage in the process, meaning that when the polyurethane foam sheet, or a laminated sheet produced using the polyurethane foam sheet, is wound into a roll or the like, the conventional problem wherein stress applied to the sheet can cause deformation or even collapse of the foam shape can be effectively resolved, and they were thus able to complete the present invention.

In other words, the present invention provides a method of producing a polyurethane foam sheet, including the steps of applying a liquid mixture, obtained by mixing together a heated and melted hot melt urethane prepolymer (A) containing isocyanate groups at the molecular terminals, and a compound (B) containing at least 2 active hydrogen atom-containing groups, onto a substrate in a sheet-like manner, and water foaming the liquid mixture by bringing the sheet-like liquid mixture into contact with water vapor.

Furthermore, in order to facilitate control of the thickness of the produced polyurethane foam sheet, the present invention also provides a method of producing a polyurethane foam sheet, including the steps of forming the above sheet in a continuous manner by introducing the above liquid mixture into the space between a first releasable substrate and a second releasable substrate, and then water foaming the liquid mixture sandwiched between the first releasable substrate and the second releasable substrate by bringing either one surface or both surfaces of the releasable substrates into contact with water vapor.

In addition, the present invention also provides a method of producing a laminated sheet containing the above polyurethane foam sheet, including the steps of applying the above liquid mixture to a substrate in a sheet-like manner, water foaming the liquid mixture by bringing the sheet-like liquid mixture into contact with water vapor, and bonding a third substrate onto the thus formed polyurethane foam sheet.

Moreover, the present invention also provides a method of producing a laminated sheet, including the steps of forming the above sheet in a continuous manner by introducing the above liquid mixture into the space between a first releasable substrate and a second releasable substrate, removing the first releasable substrate or second releasable substrate, water foaming the sheet by bringing the thus exposed surface of the sheet and/or the unpeeled surface of the remaining first or second releasable substrate into contact with water vapor, and then bonding a third substrate onto the surface of the thus formed polyurethane foam sheet from which the first or second releasable substrate has been removed.

BEST MODE FOR CARRYING OUT THE INVENTION

Figure 1:
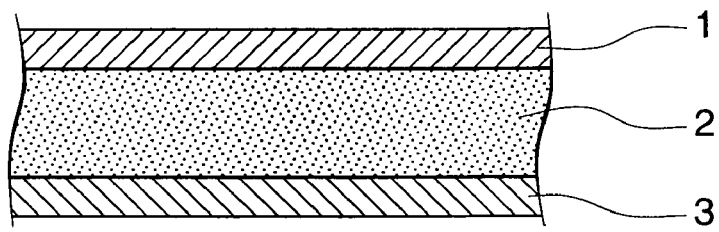
FIG. 1 is a schematic cross-sectional view of a sheet structure containing a polyurethane foam sheet according to an embodiment of the present invention.

The foam within the polyurethane foam sheet described in the present invention is usually independent foam (with independent gas bubbles), although also includes foam in which there is some partial interconnection of bubbles. The size of these gas bubbles can be controlled as appropriate, but the diameter is preferably within a range from 5.0 to 200 μm. Furthermore, although there are no particular restrictions on the thickness of the foam sheet of the present invention, in those cases where the sheet is used within an artificial leather or a synthetic leather, the thickness is preferably within a range from 0.05 to 0.5 mm in order to achieve favorable texture and mechanical strength, although this value is also dependent on the texture of the non-resin-impregnated nonwoven fabric, resin-impregnated nonwoven fabric, woven fabric, or knitted fabric that is laminated to the foam sheet.

The foaming degree of the polyurethane foam sheet can be appropriately adjusted in accordance with the intended application, provided this does not impair the texture or strength. For example, in the case of applications to either artificial leather or synthetic leather, the foaming degree is preferably within a range from 1.5 to 3.0. The term "foaming degree" refers to the ratio $V_2/V_1$ between the volume ($V_2$) of the resin following foaming, and the volume ($V_1$) of the resin prior to foaming.

As follows is a description of a method of producing a polyurethane foam sheet of the present invention.

A method of producing a polyurethane foam sheet of the present invention includes the steps of applying a liquid mixture, obtained by mixing together a heated and melted hot melt urethane prepolymer (A) containing isocyanate groups at the molecular terminals, and a compound (B) containing at least 2 active hydrogen atom-containing groups, onto a substrate in a sheet-like manner, and water foaming the liquid mixture by bringing the sheet-like liquid mixture into contact with water vapor.

Furthermore, in order to control the form of the gas bubbles within the produced foam sheet within a range from independent bubbles through to interconnected bubbles, a technique in which a urethanization catalyst (C) and a foam stabilizer (D) are added to the liquid mixture of the aforementioned hot melt urethane prepolymer (A) and the compound (B) containing at least 2 active hydrogen atom-containing groups is very effective. Furthermore, the shape of the foam cells can also be effectively controlled by altering the conditions (such as the atmospheric temperature at the surface of the liquid mixture, the atmospheric humidity, and the contact time) under which the water vapor is brought into contact with the aforementioned liquid mixture.

According to a method of producing a polyurethane foam sheet of the present invention, easy control of the foam shape is possible even in the case of a comparatively thin foam sheet of thickness 50 to 200 μm, and a polyurethane foam sheet with uniform foam shape, a soft texture, good flexibility, and excellent mechanical strength and durability such as resistance to hydrolysis and heat can be produced. A significant factor in achieving these superior effects is the use, within the present invention, of a combination of the hot melt urethane prepolymer (A) containing isocyanate groups at the molecular terminals, and a compound (B) containing at least 2 active hydrogen atom-containing groups.

In order to ensure easy control of the foam shape, enabling more favorable uniformity of the foam shape, the liquid mixture requires a suitable level of viscosity at the point where the water vapor is brought into contact with the liquid mixture, and conventional liquid urethane prepolymers that are liquid at room temperature are unable to provide satisfactory control of the foam shape.

In the present invention, it is only by using a combination of a hot melt urethane prepolymer (A) and a compound (B) containing at least 2 active hydrogen atom-containing groups as the urethane prepolymer that easy control of the foam shape is achieved, and the foam shape is able to be controlled with a high degree of precision.

The hot melt urethane prepolymer (A) adopts a suitable state of fluidity on heating and melting, and the mixture with the compound (B) can be applied to a releasable substrate or the like in a sheet-like manner by suitable heating of the mixture.

Following application in a sheet-like manner, the aforementioned liquid mixture of the hot melt urethane prepolymer (A) and the compound (B) is cooled to a temperature that is in keeping with the atmospheric temperature, and this cooling causes an increase in the viscosity of the liquid mixture. By ensuring that the liquid mixture has a suitable viscosity at the stage of water foaming, where water vapor is brought into contact with the liquid mixture, and the cross-linking reaction between the isocyanate groups within the hot melt urethane prepolymer (A), the active hydrogen atom-containing groups of the compound (B) and the moisture (water) in the atmosphere proceeds, a more favorable water foaming can be achieved.

Furthermore, in this water foaming step, the isocyanate groups within the hot melt urethane prepolymer (A) undergo a cross-linking reaction with the water vapor or moisture (water), and this cross-linking reaction causes the viscosity of the above liquid mixture to increase further. This leads to solidification, and the generation of a suitable cohesive force, and the generated foam can be stabilized more quickly, meaning the foam can be rapidly converted to a state in which it is resistant to shape deformation.

Immediately following the step of bringing the mixture into contact with water vapor or moisture, unreacted isocyanate groups still remain within the produced foam sheet, but subsequently, further cross-linking proceeds with either active hydrogen atom-containing groups within the residual compound (B) or atmospheric moisture (water), meaning a polyurethane foam sheet with the desired foam shape and desired levels of mechanical strength and durability, such as resistance to hydrolysis and heat, can be achieved within a relatively short period of time. The foam of a polyurethane foam sheet produced in this manner is resistant to deformation caused by the winding pressure when the sheet is wound into a roll or the like, meaning the foam shape is able to be favorably maintained.

Moreover, according to the present invention, this type of polyurethane foam sheet can be produced in a continuous manner with good efficiency.

In a method of producing a polyurethane foam sheet of the present invention, the temperature used during heating and melting of the hot melt urethane prepolymer (A) is preferably within a range from 60 to 250° C. Furthermore, the compound (B) containing at least 2 active hydrogen atom-containing groups is preferably heated to a temperature within a range from room temperature (23° C.) to 250° C., and is preferably in a liquid state when subjected to high-speed mixing with the hot melt urethane prepolymer (A). In those cases where a urethanization catalyst (C) and a foam stabilizer (D) are also used, the urethanization catalyst (C) and foam stabilizer (D) are preferably also heated to a temperature within a range from room temperature (23° C.) to 250° C.

There are no particular restrictions on the equipment used for mixing together the hot melt urethane prepolymer (A) and the compound (B), provided the equipment is capable of producing a uniform mixture. However, in order to prevent cases where the fluidity of the liquid mixture is inadequate, leading to poor application and poor adhesion when the liquid mixture of the hot melt urethane prepolymer (A) and the compound (B) is applied to various substrates to produce either foam sheets or laminated sheets, the equipment preferably contains a high-speed mixing head with a structure that enables heating of the liquid mixture. The temperature setting of this high-speed mixing head is preferably maintained within a range from the melting temperature of the hot melt urethane prepolymer (A) to a temperature 30° C. above this melting temperature. A temperature within this range ensures favorable mixing and excellent workability, meaning when water vapor or moisture (water) is brought forcibly into contact with the mixture to effect water foaming, a foam sheet with a uniform foam shape can be obtained.

The above liquid mixture, containing a mixture of the hot melt urethane prepolymer (A) and the compound (B) obtained in the manner described above, together with a urethanization catalyst (C) and a foam stabilizer (D) where required, is applied to the surface of a substrate in a sheet-like manner using a roll coater, a spray coater, a T-die coater, or a knife coater or the like, and by bringing the thus formed sheet of the liquid mixture into contact with water vapor or moisture (water) to effect water foaming, a polyurethane foam sheet is obtained.

In a preferable method, a roll coater is used, as it enables more precise control of the thickness of the resulting polyurethane foam sheet, and the liquid mixture is applied in a sheet-like manner between a first releasable substrate and a second releasable substrate that have been heated to a set temperature within a range from 10 to 120° C., and water foaming is then conducted via a humidification treatment that involves spray misting high-temperature water vapor, onto either one or both of the releasable substrates, or directly onto the sheet-like liquid mixture following removal of one of the releasable substrates, thereby producing a polyurethane foam sheet.

The technical term "water foaming" used in the present invention refers to a technique in which water is used as the foaming agent, and foaming is achieved by generating carbon dioxide gas by reacting the isocyanate groups of the hot melt urethane prepolymer (A) of the present invention with the water. In a method of producing a polyurethane foam sheet according to the present invention, water foaming can be conducted effectively by bringing water vapor or moisture (water) into contact with the above liquid mixture.

There are no particular restrictions on the conditions used for bringing the water vapor or moisture (water) into contact with the liquid mixture, provided the conditions do not impair the cross-linking reactivity of the isocyanate groups of the hot melt urethane prepolymer (A), although the atmospheric temperature at the surface of the sheet-like liquid mixture containing the hot melt urethane prepolymer (A) and the compound (B) is preferably set to a temperature within a range from 40 to 120° C., and even more preferably from 60 to 80° C, the atmospheric humidity is preferably set to at least 60%, and the humidification time period is preferably set to a value within a range from 0.5 seconds to 10 minutes.

Furthermore, the method used for bringing the water vapor or moisture (water) into contact with the liquid mixture typically employs a humidification chamber or a water vapor spray misting device or the like that enables conditions such as the atmospheric temperature and atmospheric humidity at the surface of the liquid mixture, and the humidification time period to be maintained at constant levels, and a method that employs a device that generates a saturated water vapor environment is particularly preferred, as this reduces the likelihood of the water vapor cooling and generating water droplets during progression through the production line. Furthermore, in order to ensure even more precise control of the sheet thickness, a compression belt press, nip rollers, or a flat press may also be used following the humidification treatment.

By bonding a third substrate onto the top of a polyurethane foam sheet produced in the manner described above, a laminated sheet containing a polyurethane foam sheet can be produced. In this case, the water foaming, namely the step of bringing the structure into contact with water vapor or moisture (water), may be conducted either before, or after, the bonding of the third substrate.

Specifically, a method of producing a laminated sheet of the present invention preferably involves forming a sheet-like product in a continuous manner by introducing the above liquid mixture, containing a mixture of the hot melt urethane prepolymer (A) and the compound (B) obtained in the manner described above, together with a urethanization catalyst (C) and a foam stabilizer (D) where required, into the space between a first releasable substrate and a second releasable substrate, followed by any one of the following:

(i) water foaming the liquid mixture by bringing either one, or both of the releasable substrates into contact with water vapor, specifically, by spray misting water vapor to effect a humidification treatment, and then removing either the first or second releasable substrate and bonding a third substrate to the thus exposed surface of the foam sheet, (ii) removing the first releasable substrate or second releasable substrate, water foaming the liquid mixture by bringing the thus exposed surface of the sheet and/or the unpeeled surface of the remaining first or second releasable substrate into contact with water vapor, and then bonding a third substrate onto the surface of the thus formed polyurethane foam sheet from which the first or second releasable substrate has been removed, (iii) removing the first releasable substrate or second releasable substrate, bonding a third substrate to the thus exposed surface of the sheet-like product, and then water foaming the liquid mixture by bringing the unpeeled surface of the remaining first or second releasable substrate, and/or the third substrate, into contact with water vapor.

The first and second releasable substrates used in the present invention can use any substrate that displays good releasability relative to the product polyurethane foam sheet, or substrates that have undergone surface release treatment. In those cases where water vapor is brought into contact with the releasable substrate, the use of releasable substrates with favorable water vapor permeability as well as favorable releasability is preferred.

Suitable examples of such releasable substrates include release paper, release-treated fabric, water repellent fabric, polyolefin sheets or films such as polyethylene and polypropylene, fluororesin films, and release paper-coated plastic films. Examples of suitable release paper-coated plastic films include films of those polyurethane resins conventionally used as the outer surface layer of artificial leather or synthetic leather, which have then been coated with release paper.

This polyurethane resin for the outer surface layer can use a solvent-based, water-based, or solvent-free polyurethane resin.

The first releasable substrate and second releasable substrate used in the production of the aforementioned polyurethane foam sheet and laminated sheet preferably display a difference in their respective 180 degree peel strength (JIS test number: K6854-2) values, relative to the liquid mixture of the hot melt urethane prepolymer (A) and the compound (B), or the product polyurethane foam sheet, of at least 1.0 N/25 mm. By ensuring this level of difference, cohesive failure of the liquid mixture or polyurethane foam sheet can be prevented during the removal of the first and second releasable substrates, and one of the two substrates can be effectively removed.

Furthermore, the third substrate used in the production of the above laminated sheet can use the types of nonwoven, woven, or knitted base fabrics typically used within artificial leather and synthetic leather, as well as natural leather, various plastic sheets or films, release paper-coated plastic films, adhesive-coated release papers, adhesive-coated sheets, adhesive-coated films, release papers, and paper and the like.

In addition, nonwoven fabrics that have been impregnated with at least one material selected from solvent-based, water-based and solvent-free polyurethane resins, acrylic resins, and butadiene-based resins (SBR, NBR, and MBR) can also be used.

Moreover, the polyurethane foam sheet or laminated sheet produced by the production method of the present invention may also be bonded to a separate substrate, using a solvent-based, water-based, solvent-free, or hot melt adhesive applied across either the entire surface of the sheet, or in a dot pattern or fiber-like (web-like) pattern.

As follows is a description of the hot melt urethane prepolymer (A) containing isocyanate groups at the molecular terminals that is used in the present invention.

The hot melt urethane prepolymer (A) used in the present invention is a compound with intramolecular isocyanate groups that are capable of reacting with moisture to form cross-linked structures, and is typically a solid or highly viscous liquid at room temperature. Materials known as urethane prepolymers generally have comparatively low molecular weights, although those skilled in the art also refer to materials with number average molecular weights (Mn) in the order of several tens of thousands as urethane prepolymers, and the present invention also allows the use of urethane prepolymers with number average molecular weights (Mn) in the order of several tens of thousands.

The number average molecular weight (Mn) of the hot melt urethane prepolymer (A) is preferably within a range from 500 to 30,000, and even more preferably from 1,000 to 10,000. Provided the number average molecular weight (Mn) of the hot melt urethane prepolymer (A) falls within the above range, the melt viscosity also falls within a favorable range.

Furthermore, the melt viscosity of the hot melt urethane prepolymer (A), measured at 125° C. using a cone-plate viscometer, is preferably within a range from 100 to 100,000 mPa·s, and even more preferably from 1,000 to 50,000 mPa·s. Provided the melt viscosity at 125° C. falls within the above range, the mixing efficiency upon melting and mixing of the hot melt urethane prepolymer (A) and the compound (B) containing at least 2 active hydrogen atom-containing groups is favorable, and when water foaming is then conducted by bringing water vapor or moisture (water) into contact with the resulting liquid mixture, followed by cooling and solidification, the resin viscosity increases, and collapse of the foam under winding pressure or the like during subsequent processing can be effectively reduced.

The hot melt urethane prepolymer (A) used in the present invention displays a moisture cross-linking reactivity property (moisture curability), together with a hot melt property.

The moisture cross-linking reactivity property of the hot melt urethane prepolymer (A) is based on the cross-linking reaction initiated by the reaction between the isocyanate groups of the hot melt urethane prepolymer (A) and moisture (water), and as such, is derived from the isocyanate groups.

On the other hand, the hot melt property of the hot melt urethane prepolymer (A) is based on the molecular structure of the urethane prepolymer that is selected, and is a property wherein the prepolymer is solid at room temperature, melts to form a coatable liquid under heating, which can be applied in the melted state, and then solidifies and develops adhesiveness on cooling.

The term "hot melt" is a generic term describing a property wherein a material is a solid or highly viscous liquid at room temperature, but then melts on heating to form a fluid or liquid state. Hot melt materials are solvent-free, either solid or highly viscous liquid at room temperature, melt to form a coatable liquid on heating, and then regain their cohesive force on cooling.

The hot melt urethane prepolymer (A) containing isocyanate groups at the molecular terminals used in the present invention is produced by reacting a polyol and a polyisocyanate, under conditions wherein the isocyanate groups of the polyisocyanate are present in excess relative to the hydroxyl groups of the polyol. The equivalence ratio isocyanate groups/hydroxyl groups is preferably within a range from 1.1 to 5.0, and even more preferably from 1.5 to 3.0.

Examples of polyols that can be used in the production of the hot melt urethane prepolymer (A) used in the present invention include polyester-based polyols, polyether-based polyols, polycarbonate-based polyols, acrylic-based polyols, polyolefin-based polyols, castor oil-based polyols and silicon-modified polyols, as well as mixtures or copolymers thereof.

Examples of polyester-based polyols that can be used in the production of the hot melt urethane prepolymer (A) include condensation products of a polyhydric alcohol and a polybasic acid. Specific examples of suitable polyhydric alcohols include ethylene glycol, 1,2-propylene glycol, 1,3-propylene glycol, 1,3-butanediol, 1,4-butanediol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, cyclohexane-1,4-diol, cyclohexane-1,4-dimethanol, or one or more materials selected from amongst ethylene oxide or propylene oxide addition products of bisphenol A and the like.

Furthermore, examples of polybasic acids that can be used in the production of the polyester-based polyols include one or more materials selected from amongst succinic acid, maleic acid, adipic acid, glutaric acid, pimelic acid, suberic acid, azelaic acid, sebacic acid, dodecanedicarboxylic acid, phthalic acid, isophthalic acid, terephthalic acid, and hexahydroisophthalic acid and the like.

Furthermore, polymers formed by ring opening polymerization of lactones such as γ-butyrolactone and ε-caprolactone, using the aforementioned polyhydric alcohols as initiators, can also be used.

Furthermore, examples of polyether-based polyols that can be used in the production of the hot melt urethane prepolymer (A) include polymers formed by ring opening polymerization of one or more of ethylene oxide, propylene oxide, butylene oxide, and styrene oxide and the like, using an aforementioned polyhydric alcohol or an aforementioned polyester-based polyol as an initiator.

Ring opening addition polymerization products of lactones such as γ-butyrolactone and ε-caprolactone with an aforementioned polyether-based polyol can also be used.

Furthermore, examples of polycarbonate-based polyols that can be used in the production of the hot melt urethane prepolymer (A) include poly(alkylene carbonate) diols produced by a condensation reaction of an aforementioned polyhydric alcohol, with one or more materials from amongst diaryl carbonates, dialkyl carbonates, and alkylene carbonates.

In addition, the aforementioned polyhydric alcohols can also be used as the polyol in the production of the hot melt urethane prepolymer (A).

Examples of polyisocyanates that can be used in the production of the hot melt urethane prepolymer (A) include aromatic diisocyanates such as phenylene diisocyanate, tolylene diisocyanate (TDI), 4,4'-diphenylmethane diisocyanate, 2,4'-diphenylmethane diisocyanate, and naphthalene diisocyanate, aliphatic diisocyanates such as hexamethylene diisocyanate, lysine diisocyanate, cyclohexane diisocyanate, isophorone diisocyanate, dicyclohexylmethane diisocyanate, xylylene diisocyanate, and tetramethylxylylene diisocyanate, as well as alicyclic diisocyanates, and polymeric MDI containing dimers or trimers of 4,4'-diphenylmethane diisocyanate (MDI). Taking into consideration the fact that the hot melt urethane prepolymer (A) is heated and melted during use, 4,4'-diphenylmethane diisocyanate (MDI), which has a low vapor pressure on heating, is particularly preferred amongst the above compounds.

Furthermore, a hot melt urethane prepolymer (a-2) that contains hydrolysable alkoxysilyl groups in addition to the isocyanate groups at the molecular terminals can also be used as the hot melt urethane prepolymer (A).

This hot melt urethane prepolymer (a-2) can be produced by reacting a polyol, a polyisocyanate, and a compound that contains both an active hydrogen atom-containing group that displays reactivity relative to isocyanate groups, and a hydrolysable alkoxysilyl group. For example, a hot melt urethane prepolymer (a-2) can be produced by reacting a hot melt urethane prepolymer (A) containing isocyanate groups at the molecular terminals with a compound that contains both an active hydrogen atom-containing group that displays reactivity relative to isocyanate groups, and a hydrolysable alkoxysilyl group.

The moisture cross-linking reaction of the hot melt urethane prepolymer (A) used in the present invention describes a reaction between the isocyanate groups of the hot melt urethane prepolymer (A) and moisture (water), but in those cases where an aforementioned hot melt urethane prepolymer (a-2) is used, a reaction also occurs between the hydrolysable alkoxysilyl groups of the hot melt urethane prepolymer (a-2) and the moisture (water).

Examples of the compound that contains both an active hydrogen atom-containing group that displays reactivity relative to isocyanate groups, and a hydrolysable alkoxysilyl group, which is used in the production of the hot melt urethane prepolymer (a-2), include the compounds represented by a general formula [1] shown below.

General formula [1]

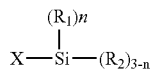

(In the general formula [1], $R_1$ represents a hydrogen atom, or a monovalent organic residue selected from a group consisting of alkyl groups, aryl groups, and aralkyl groups, $R_2$ represents a halogen atom, or an alkoxyl group, acyloxy group, phenoxy group, iminoxy group, or alkenyloxy group, and n represents an integer of 0, 1, or 2. Furthermore, X represents an organic residue containing one or more amino groups, hydroxyl groups, or mercapto groups.) Examples of the active hydrogen atom-containing group within the compound represented by the general formula [1] include an amino group, hydroxyl group, or mercapto group, although of these, an amino group is preferred as it provides superior reactivity with an isocyanate group.

Furthermore, examples of the hydrolysable alkoxysilyl group within the compound represented by the general formula [1] include easily hydrolyzed groups such as a halosilyl group, alkoxysilyl group, acyloxysilyl group, phenoxysilyl group, iminoxysilyl group, or alkenyloxysilyl group.

Of these hydrolysable alkoxysilyl groups, a trimethoxysilyl group, triethoxysilyl group, (methyl)dimethoxysilyl group, or (methyl)diethoxysilyl group is preferred, as such groups provide a more easy progression of the cross-linking reaction with moisture (water).

Specific examples of the aforementioned compound that contains both an active hydrogen atom-containing group that displays reactivity relative to isocyanate groups, and a hydrolysable alkoxysilyl group, include γ-(2-aminoethyl) aminopropyltrimethoxysilane, γ-(2-hydroxyethyl)aminopropyltrimethoxysilane, γ-(2-aminoethyl)aminopropyltriethoxysilane, γ-(2-hydroxyethyl)aminopropyltriethoxysilane, γ-(2-aminoethyl)aminopropylmethyldimethoxysilane, γ-(2-aminoethyl)aminopropylmethyldiethoxysilane, γ-(2-hydroxyethyl)aminopropylmethyldimethoxysilane, and γ-(2-hydroxyethyl)aminopropylmethyldiethoxysilane, as well as γ-(N,N-di-2-hydroxyethyl)aminopropyltriethoxysilane, γ-aminopropyltrimethoxysilane, γ-aminopropyltriethoxysilane, γ-aminopropylmethyldimethoxysilane, γ-aminopropylmethyldiethoxysilane, γ-(N-phenyl)aminopropyltrimethoxysilane, γ-mercaptopropyltrimethoxysilane, and γ-mercaptophenyltrimethoxysilane.

A variety of conventional methods can be used to produce the hot melt urethane prepolymer (A) used in the present invention. For example, the hot melt urethane prepolymer (A) can be prepared by adding the polyol, from which any moisture has been removed, in a dropwise manner to the polyisocyanate, or by mixing the polyisocyanate with the moisture-free polyol, and then heating to effect a batch-type reaction, or by heating the moisture-free polyol and the polyisocyanate, and then reacting the two components in a predetermined ratio using a continuous extrusion-type reaction system, and by continuing the reaction until the hydroxyl groups of the polyol have all reacted.

Furthermore, by adding a compound that contains both an active hydrogen atom-containing group that displays reactivity relative to isocyanate groups, and a hydrolysable alkoxysilyl group in a dropwise manner to the prepared hot melt urethane prepolymer (A) containing isocyanate groups at the molecular terminals, and then conducting subsequent heat treatment as required, a hot melt urethane prepolymer (a-2) that contains hydrolysable alkoxysilyl groups in addition to the isocyanate groups at the molecular terminals can be produced.

This reaction can be conducted without solvent, although in some cases, the reaction may also be conducted in an organic solvent, with the solvent being subsequently removed. In those cases where the reaction is conducted in an organic solvent, any of various known organic solvents can be used, including ethyl acetate, n-butyl acetate, methyl ethyl ketone, and toluene. In such cases, the solvent must be removed following reaction, using a suitable solvent removal method such as heating under reduced pressure.

The isocyanate group content of the hot melt urethane prepolymer (A) is preferably within a range from 0.5 to 10.0% by weight, and even more preferably from 1.0 to 6.0% by weight. If the isocyanate group content falls within this range, then the melt viscosity of the hot melt urethane prepolymer (A) following heating and melting falls within a favorable range, and the workability of the melt is also favorable.

Furthermore, the problem wherein the volume of carbon dioxide generated by the water foaming becomes overly high, causing the foaming degree to become too large, is also avoided, and the generated foam exhibits a high level of uniformity and easy control of the foam thickness. Moreover, the cross-linking density also falls within a suitable range, meaning the foam texture is ideally suited to developments for applications such as clothing, synthetic leather, and artificial leather and the like.

In other words, provided the isocyanate group content of the hot melt urethane prepolymer (A) falls within the aforementioned range, superior levels of processability, foaming, and foam sustainability, together with more favorable levels of cross-linking density, texture and durability can be obtained.

By mixing the compound (B) containing at least 2 active hydrogen atom-containing groups used in the present invention with the aforementioned melted hot melt urethane prepolymer (A) containing isocyanate groups at the molecular terminals, the isocyanate groups of the hot melt urethane prepolymer (A) react with the active hydrogen atom-containing groups of the compound (B), thereby raising the viscosity of the liquid mixture to a suitable level, which is extremely effective in ensuring stabilization of the bubbles within the foam sheet during water foaming, and also contributes to improvements in the flexibility, the mechanical strength, and the durability of the produced foam sheet.

The active hydrogen atom-containing groups of the compound (B) are preferably hydroxyl groups or amino groups.

Specific examples of the compound (B) containing at least 2 active hydrogen atom-containing groups used in the present invention include diols such as ethylene glycol, 1,2-propylene glycol, 1,3-propylene glycol, 1,3-butanediol, 1,4-butanediol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, cyclohexane-1,4-diol, and cyclohexane-1,4-dimethanol, as well as the various polyols listed above as being suitable for use in the production of the hot melt urethane prepolymer (A).

In addition, polyamines such as ethylenediamine, 1,3-propylenediamine, 1,2-propylenediamine, hexamethylenediamine, norbornenediamine, hydrazine, piperazine, N,N'-diaminopiperazine, 2-methylpiperazine, 4,4'-diaminodicyclohexylmethane, isophoronediamine, diaminobenzene, diphenylmethanediamine, methylenebis-dichloroaniline, and tetramethylhexamethylenediamine can also be used as the compound (B).

This compound (B) can be used either alone, or in combinations of two or more different compounds.

Of the above compounds, diols are preferred, as they undergo a more gentle reaction with the isocyanate groups of the hot melt urethane prepolymer (A), meaning the reaction rate can be more easily controlled.

The quantity used of the compound (B) containing at least 2 active hydrogen atom-containing groups, reported as a ratio of the weight equivalence of the active hydrogen atom-containing groups within the compound (B) relative to the weight equivalence of the isocyanate groups within the hot melt urethane prepolymer (A) [isocyanate group equivalence/active hydrogen atom-containing group equivalence], is preferably within a range from 1.5 to 20.0, and even more preferably from 2.0 to 15.0.

If the ratio falls within this range, then a favorable balance is achieved between the stabilization of the foam cells provided by the increase in viscosity of the liquid mixture containing the hot melt urethane prepolymer (A) and the compound (B), the water foaming characteristics achieved by bringing water vapor or moisture (water) into contact with the liquid mixture, and the heat resistance arising from three dimensional structure formation caused by the moisture curing reaction of the isocyanate groups that takes place following foaming.

Furthermore, water, or various emulsions or latexes of polyurethane or polyacrylic can also be used as the aforementioned compound (B) containing at least 2 active hydrogen atom-containing groups.

The aforementioned urethanization catalyst (C) that can be used in the present invention preferably exhibits a catalytic constant ratio $KW_2/KW_1$ of at least 0.5, wherein $KW_2$ represents the catalytic constant per unit of weight for the reaction between water and tolylene diisocyanate (TDI), and $KW_1$ represents the catalytic constant per unit of weight for the reaction between diethylene glycol (DEG) and tolylene diisocyanate (TDI). Provided this catalytic constant ratio $KW_2/KW_1$ falls within this range, the reaction (water foaming) between the water vapor or moisture (water) and the isocyanate groups can be accelerated, meaning more favorable water foaming characteristics can be achieved when water vapor or moisture (water) is brought in contact with the liquid mixture of the hot melt urethane prepolymer (A) and the compound (B). Specifically, amine-based catalysts are particularly desirable.

The catalytic constants $KW_1$ and $KW_2$ for the urethanization catalyst (C) are determined by measuring the reaction rates of the polyurethane forming reaction equations (1) and (2) shown below.

$$RNCO + R'OH \rightarrow RNHC(=O)OOR' \quad \text{Reaction equation (1):}$$

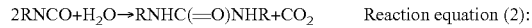
$$2RNCO + H_2O \rightarrow RNHC(=O)NHR + CO_2 \quad \text{Reaction equation (2):}$$

The method of measuring these reaction rates uses the method of A. Farkas (reference document: J. Am. Chem. Soc., Vol. 82, page 642 (1960)), and involves measuring the rate constant ($K_2$) for the reaction between water and TDI, and the rate constant ($K_1$) for the reaction between TDI and DEG, in solutions of benzene at 30° C. For the sake of convenience, the catalytic constants are then expressed per unit of weight, as $KW_2$ and $KW_1$ respectively.

Examples of urethanization catalysts (C) for which the aforementioned catalytic constant ratio $KW_2/KW_1$ is at least 0.2, which can be used favorably in the present invention, include amine-based catalysts such as N,N-dimethylcyclohexylamine (DMCHA), N-methyldicyclohexylamine (MDCHA), N,N,N',N'-tetramethylethylenediamine (TMEDA), N,N,N',N'-tetramethylpropylenediamine (TMPDA), N,N,N',N'-tetramethylhexamethylenediamine (TMHMDA), N,N,N',N'',N''-pentamethyldiethylenetriamine (PMDETA), N,N,N',N'',N''-pentamethylethylenepropylenetriamine (PMEPTA), N,N,N',N'',N''-pentamethyldipropylenetriamine (PMDPTA), N,N,N',N'',N''',N'''-hexamethyldipropyleneethylenetetramine (HMDPETA), N,N'-dimethylpiperazine (DMP), N,N,N''-trimethyl-N'-aminoethylpiperazine (TMNAEP), N-methylmorpholine (NMMO), N-hydroxyethylmorpholine (HEMO), N,N,N',N'-tetramethylethylene glycol dipropylenediamine (TMEGDPDA), N,N,N',N'',N''',N'''-hexamethyltriethylenetetramine (HMTETA), N,N-dimethylaminoethylethanol ether (DMAEE), N,N,N'-trimethylaminoethylethanolamine (TMAEEA), N,N,N',N'-bis-dimethylaminoethyl ether (BDMEE), and triethylamine (TEA).

Furthermore, one or more other urethanization catalysts such as stannous octanoate, di-n-butyltin diacetate, di-n-butyltin dilaurate, 1,8-diazabicyclo(5,4,0)undecene-7 (DBU), DBU p-toluenesulfonate, DBU formate, DBU octanoate, and DBU phenolate may also be used.

The quantity used of the urethanization catalyst (C) is preferably within a range from 0.01 to 20 parts by weight, and even more preferably from 0.1 to 10 parts by weight, per 100 parts by weight of the hot melt urethane prepolymer (A).

Provided the quantity of the urethanization catalyst (C) falls within this range, the liquid mixture of the hot melt urethane prepolymer (A) and the compound (B) does not gel, but rather maintains favorable workability, the reaction between the isocyanate groups of the hot melt urethane prepolymer (A) and the water vapor or moisture (water) can be favorably accelerated when water vapor or moisture (water) is brought in contact with the liquid mixture, and the reaction of the isocyanate groups and the active hydrogen atom-containing groups within the compound (B) and the atmospheric moisture is also rapid, meaning the process for producing the target polyurethane foam sheet can be shortened.

As mentioned above, a foam stabilizer (D) may also be used in the present invention if required, although the quantity used should preferably be restricted to a value that does not impair the original moisture curability of the isocyanate groups within the hot melt urethane prepolymer (A).

Specifically, agents containing at least 10% by weight of the type of polysiloxane-polyoxyalkylene copolymers used in organosilicon surfactants and the like can be used.

Specific examples of suitable foam stabilizers include the products SF2969, PRX607, SF2964, SRX274C, SF2961, SF2962, SF2965, SF2908, BY10-123, SF2904, SRX294A, BY10540, SF2935F, SF2945F, SF2944F, SF2936F, SH193, SH192H, SH192, SF2909, SH194, SH190, SRX280A, and SRX298 manufactured by Dow Corning Toray Silicone Co., Ltd., and the products L580, SZ1127, SZ1111, SZ1136, SZ1919, SZ1105, SZ1142, SZ1162, L3601, L5309, L5366, SZ1306, SZ1311, SZ1313, SZ1342, L5340, L5420, SZ1605, SZ1627, SZ1642, SZ1649, SZ1671, SZ1675, and SZ1923 manufactured by Nippon Unicar Company Ltd.

Furthermore, plasticizers such as bis(2-ethylhexyl) phthalate (DOP), diisononyl adipate (DINA), and bis(2-ethylhexyl) adipate (DOA), and polyether-based surfactants such as ethylene oxide/propylene oxide copolymers may also be added to the foam stabilizer (D) if required.

The quantity used of the foam stabilizer (D) is preferably within a range from 0.1 to 20 parts by weight, and even more preferably from 0.5 to 10 parts by weight, per 100 parts by weight of the hot melt urethane prepolymer (A). Provided the quantity of the foam stabilizer (D) falls within this range, the foam control characteristics are excellent, and the product foam sheet exhibits excellent mechanical strength.

In the present invention, the liquid mixture obtained by mixing together a heated and melted hot melt urethane prepolymer (A), a compound (B) containing at least 2 active hydrogen atom-containing groups, and where necessary a urethanization catalyst (C) and a foam stabilizer (D), may also contain one or more additives such as inert gases, silane coupling agents, fillers, thixotropic imparting agents, tackifier, waxes, plasticizers, thermal stabilizers, light stabilizers, fillers, pigments, fluorescent brighteners, or foaming agents, as well as thermoplastic resins, thermosetting resins, dyes, conductivity imparting agents, antistatic agents, moisture penetration improvers, water repellents, oil repellents, microballoon, compounds containing water of crystallization, flame retardants, water absorbers, moisture absorbers, deodorizers, anti-blocking agents, hydrolysis prevention agents, and organic or inorganic water-soluble compounds.

Examples of suitable inert gases include nitrogen, the rare gases, carbon dioxide, or halogenated hydrocarbons, as well as inert gases in a supercritical state.

Furthermore, in those cases where a hot melt urethane prepolymer (a-2) that contains hydrolysable alkoxysilyl groups in addition to the isocyanate groups at the molecular terminals is used as the hot melt urethane prepolymer (A), a cross-linking catalyst can also be used if required, with suitable examples including various acidic compounds such as malic acid and citric acid, various basic compounds such as lithium hydroxide, sodium hydroxide, potassium hydroxide, and triethylenediamine, various metal-containing compounds such as tetraisopropyl titanate, di-n-butyltin diacetate, di-n- butyltin dilaurate, di-n-butyltin oxide, dioctyltin oxide, and di-n-butyltin maleate, and any other compounds typically used as cross-linking catalysts for hydrolysable alkoxysilanes.

Examples of suitable silane coupling agents include γ-glycidoxypropyltrimethoxysilane, γ-glycidoxypropylmethyldimethoxysilane, β-(3,4-epoxycyclohexyl)ethyltrimethoxysilane, γ-methacryloxypropyltrimethoxysilane, γ-mercaptopropyltrimethoxysilane, vinyltrimethoxysilane, and γ-chloropropyltrimethoxysilane.

Examples of suitable fillers include calcium carbonate, aluminum hydroxide, barium sulfate, kaolin, talc, carbon black, alumina, magnesium oxide, inorganic and organic balloons, lithia tourmaline, and activated carbon.

Furthermore, surface treated calcium carbonate, finely powdered silica, bentonite, and zeolite, which are known as thixotropic imparting agents, can also be used. The addition of a thixotropic imparting agent is particularly desirable in terms of stabilizing the foam generated during water foaming.

A polyurethane foam sheet or a laminated sheet obtained via the present invention may also be subjected to appropriate after-treatments, including surface processing involving additional lamination or coating by conventional methods, or buffing treatments.

Polyurethane foam sheets produced using the present invention, and laminated sheets produced therefrom can not only be used as the synthetic leather or artificial leather used within shoes, furniture, clothing, vehicle components, bags, or storage cases, but can also be used for applications such as the substrates for adhesives and pressure-sensitive adhesives, films, sheets, insulating materials, heat retention materials, soundproofing materials, cushioning materials, antislip materials, polishing pads, medical components, speaker edging materials, wall coverings, cosmetic powder-puffs, lower back supports, supporters, substrates for bandages, tourniquets, pillows, and various forms of packing, and as shock absorbing materials, cushioning materials, core materials, and substrates and the like within all manner of fields including electrical fields, electronics, construction, clothing, medical treatment, foodstuffs, and chemicals.

As follows is a description of embodiments of the present invention with reference to the drawings. The drawings described below merely represent possible embodiments of the present invention, and in no way restrict the positions or the like of each region, provided the objects of the invention are satisfied.

FIG. 1 is a schematic cross-sectional view of a sheet structure containing a polyurethane foam sheet according to an embodiment of the present invention. This sheet structure is formed in a continuous manner with a polyurethane foam sheet 2 disposed between a first releasable substrate 1 and a second releasable substrate 3.

Figure 2:
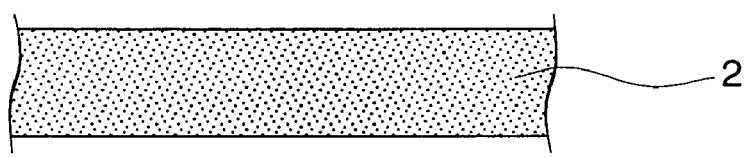
FIG. 2 is a schematic cross-sectional view of a polyurethane foam sheet according to an embodiment of the present invention.

FIG. 2 is a schematic cross-sectional view of a polyurethane foam sheet according to an embodiment of the present invention. This polyurethane foam sheet 2 is obtained by removing the first releasable substrate 1 and the second releasable substrate 3 from the sheet structure shown in FIG. 1.

Figure 3:
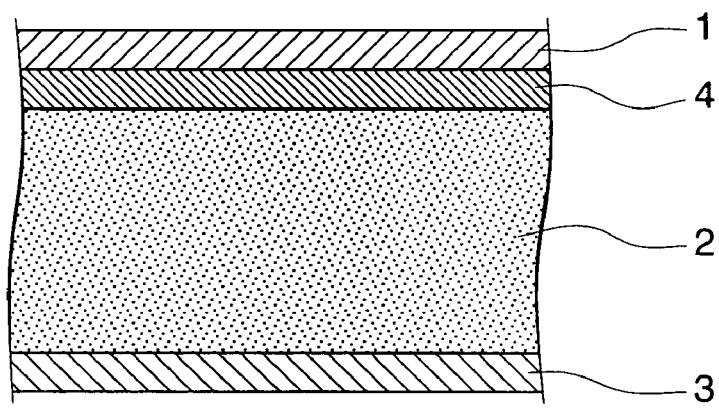
FIG. 3 is a schematic cross-sectional view of a sheet structure containing a laminated sheet that uses a polyurethane foam sheet according to an embodiment of the present invention.

FIG. 3 is a schematic cross-sectional view of a sheet structure containing a laminated sheet that uses a polyurethane foam sheet according to an embodiment of the present invention. This sheet structure is formed by coating a first releasable substrate 1 (such as release paper) with a resin used for forming an outer surface layer (such as a polyurethane resin used as an outer surface layer), thereby forming a releasable substrate-coated resin film 4, and then forming a polyurethane foam sheet 2 in a continuous manner between this resin film 4 and a second releasable substrate 3.

Figure 4:
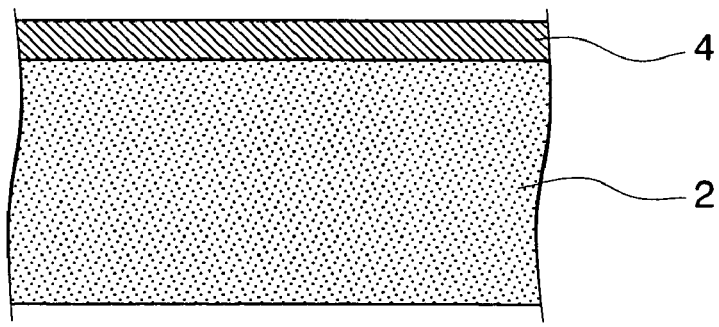
FIG. 4 is a schematic cross-sectional view of a laminated sheet that uses a polyurethane foam sheet according to an embodiment of the present invention.

FIG. 4 is a schematic cross-sectional view of a laminated sheet that uses a polyurethane foam sheet according to an embodiment of the present invention. This laminated sheet is obtained by removing the first releasable substrate 1 and the second releasable substrate 3 from the sheet structure shown in FIG. 3.

Figure 5:
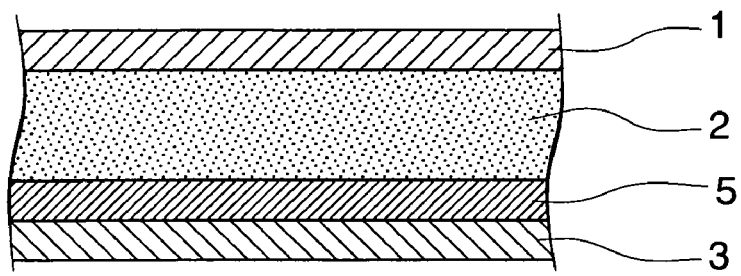
FIG. 5 is a schematic cross-sectional view of a sheet structure containing a laminated sheet that uses a polyurethane foam sheet according to an embodiment of the present invention.

FIG. 5 is a schematic cross-sectional view of a sheet structure containing a laminated sheet that uses a polyurethane foam sheet according to an embodiment of the present invention. This laminated sheet structure is formed in a continuous manner by forming a polyurethane foam sheet 2 between a first releasable substrate 1, and a third substrate 5 provided with a second releasable substrate 3 (such as an adhesive sheet) on the outside surface thereof.

Figure 6:
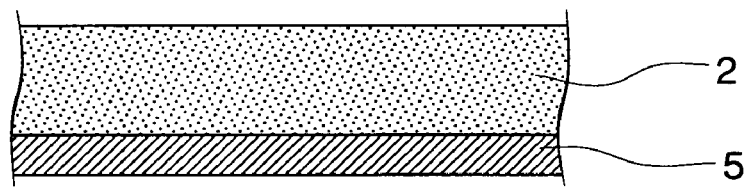
FIG. 6 is a schematic cross-sectional view of a laminated sheet that uses a polyurethane foam sheet according to an embodiment of the present invention.

FIG. 6 is a schematic cross-sectional view of a laminated sheet that uses a polyurethane foam sheet according to an embodiment of the present invention. This laminated sheet includes a third substrate 5, and a polyurethane foam sheet 2 formed in a continuous manner on top of the third substrate 5.

Figure 7:
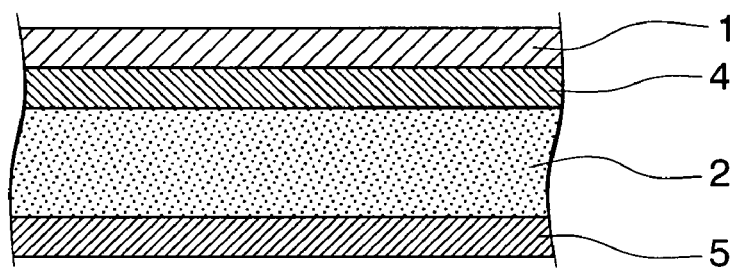
FIG. 7 is a schematic cross-sectional view of a sheet structure containing a laminated sheet that uses a polyurethane foam sheet according to an embodiment of the present invention.

FIG. 7 is a schematic cross-sectional view of a sheet structure containing a laminated sheet that uses a polyurethane foam sheet according to an embodiment of the present invention. This sheet structure is formed by coating a first releasable substrate 1 (such as release paper) with a resin used for forming an outer surface layer (such as a polyurethane resin used as an outer surface layer), thereby forming a releasable substrate-coated resin film 4, and then forming a polyurethane foam sheet 2 in a continuous manner between this resin film 4 and a third substrate 5.

Figure 8:
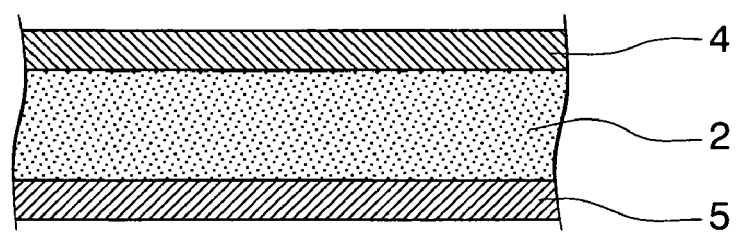
FIG. 8 is a schematic cross-sectional view of a laminated sheet that uses a polyurethane foam sheet according to an embodiment of the present invention.

FIG. 8 is a schematic cross-sectional view of a laminated sheet that uses a polyurethane foam sheet according to an embodiment of the present invention. This laminated sheet is obtained by removing the first releasable substrate I from the sheet structure shown in FIG. 7.

Figure 9:
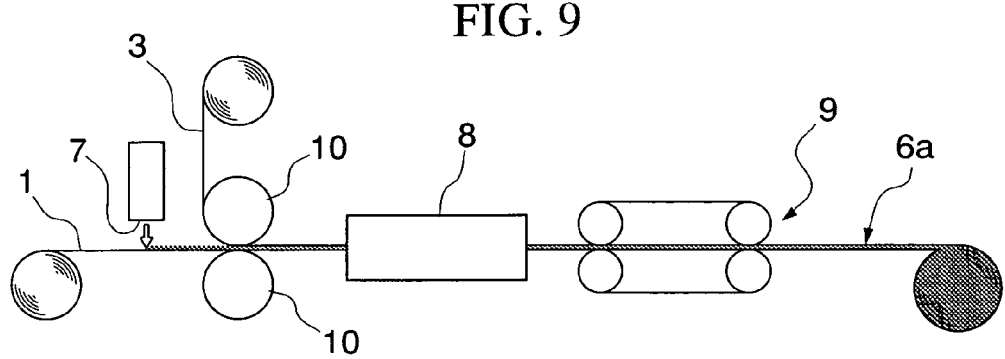
FIG. 9 is a schematic illustration showing a method of producing a polyurethane foam and a sheet structure containing such a foam according to an embodiment of the present invention.

FIG. 9 is a schematic illustration showing a method of producing a polyurethane foam sheet and a sheet structure using such a foam sheet according to an embodiment of the present invention. In this production method, a liquid mixture (not shown in the figure) obtained by mixing together a heated and melted hot melt urethane prepolymer (A) containing isocyanate groups at the molecular terminals and a compound (B) containing at least 2 active hydrogen atom-containing groups with a mixing head 7, is poured onto a first releasable substrate 1. Subsequently, a second releasable substrate 3 is overlaid on top of the liquid mixture, thereby forming a sheet structure, and this structure is then passed between a pair of application rollers 10 to form a sheet in which the thickness of the liquid mixture is uniform. This sheet structure is then passed through a high temperature steam humidification chamber 8, thus causing water foaming of the liquid mixture by bringing the sheet-like liquid mixture into contact with water vapor, and yielding a polyurethane foam sheet (not shown in the figure). In order to further improve the precision of the sheet thickness, the sheet structure is then passed through a belt press 9, yielding the target sheet structure 6a. The thus obtained sheet structure 6a has the same construction as the sheet structure shown in FIG. 1.

Figure 10:
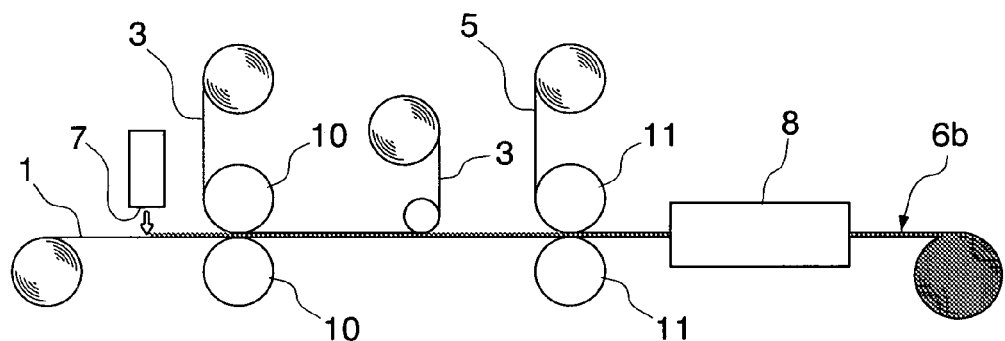
FIG. 10 is a schematic illustration showing a method of producing a polyurethane foam and a sheet structure containing a laminated sheet that uses such a foam according to an embodiment of the present invention.

FIG. 10 is a schematic illustration showing a method of producing a polyurethane foam sheet and a sheet structure containing a laminated sheet that uses such a foam sheet according to an embodiment of the present invention. In this production method, a liquid mixture (not shown in the figure) obtained by mixing together a heated and melted hot melt urethane prepolymer (A) containing isocyanate groups at the molecular terminals and a compound (B) containing at least 2 active hydrogen atom-containing groups with a mixing head 7, is poured onto a first releasable substrate 1. Subsequently, a second releasable substrate 3 is overlaid on top of the liquid mixture, thereby forming a first sheet structure, and this structure is then passed between a pair of application rollers 10 to form a sheet in which the thickness of the liquid mixture is uniform. The second releasable substrate 3 is then removed from this first sheet structure. Subsequently, a third substrate 5 is overlaid on top of the surface of the liquid mixture from which the second releasable substrate 3 has been removed, thus forming a second sheet structure, which is then passed through a pair of compression rollers 11. This second sheet structure is then passed through a high temperature steam humidification chamber 8, thus causing water foaming of the liquid mixture by bringing the sheet-like liquid mixture into contact with water vapor, and yielding a polyurethane foam sheet (not shown in the figure) which forms the target sheet structure 6b.

Figure 11:
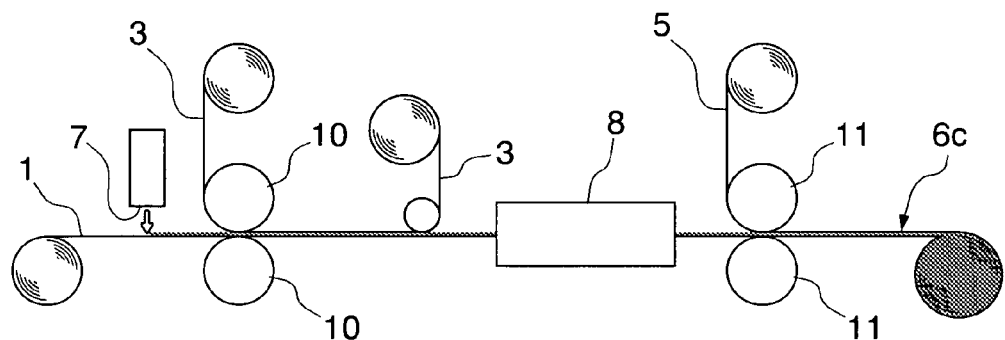
FIG. 11 is a schematic illustration showing a method of producing a polyurethane foam and a sheet structure containing a laminated sheet that uses such a foam according to an embodiment of the present invention.

FIG. 11 is a schematic illustration showing a method of producing a polyurethane foam sheet and a sheet structure containing a laminated sheet that uses such a foam sheet according to an embodiment of the present invention. In this production method, a liquid mixture (not shown in the figure) obtained by mixing together a heated and melted hot melt urethane prepolymer (A) containing isocyanate groups at the molecular terminals and a compound (B) containing at least 2 active hydrogen atom-containing groups with a mixing head 7, is poured onto a first releasable substrate 1. Subsequently, a second releasable substrate 3 is overlaid on top of the liquid mixture, thereby forming a first sheet structure, and this structure is then passed between a pair of application rollers 10 to form a sheet in which the thickness of the liquid mixture is uniform. The second releasable substrate 3 is then removed from this first sheet structure. This first sheet structure is then passed through a high temperature steam humidification chamber 8 with the sheet-like liquid mixture exposed on top of the structure, thus causing water foaming of the liquid mixture by bringing the sheet-like liquid mixture into contact with water vapor, and yielding a polyurethane foam sheet (not shown in the figure). Subsequently, a third substrate 5 is overlaid on top of this polyurethane foam sheet to form a second sheet structure, and this second sheet structure is then passed through a pair of compression rollers 11, thus yielding the target sheet structure 6c.

Figure 12:
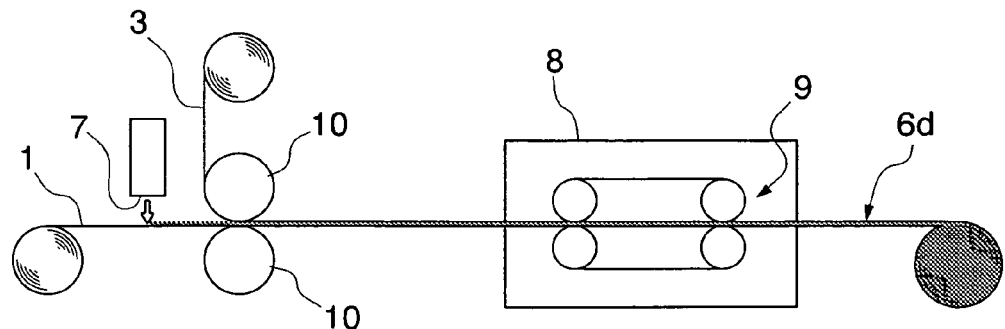
FIG. 12 is a schematic illustration showing a method of producing a polyurethane foam and a sheet structure containing such a foam sheet according to an embodiment of the present invention.

FIG. 12 is a schematic illustration showing a method of producing a polyurethane foam sheet and a sheet structure using such a foam sheet according to an embodiment of the present invention. In this production method, a liquid mixture (not shown in the figure) obtained by mixing together a heated and melted hot melt urethane prepolymer (A) containing isocyanate groups at the molecular terminals and a compound (B) containing at least 2 active hydrogen atom-containing groups with a mixing head 7, is poured onto a first releasable substrate 1. Subsequently, a second releasable substrate 3 is overlaid on top of the liquid mixture, thereby forming a sheet structure, and this structure is then passed between a pair of application rollers 10 to form a sheet in which the thickness of the liquid mixture is uniform. The sheet structure is then passed through a belt press 9 positioned inside a high temperature steam humidification chamber 8, thus causing water foaming of the liquid mixture by bringing the sheet-like liquid mixture into contact with water vapor. This not only yields a polyurethane foam sheet (not shown in the figure), but also improves the thickness precision of the sheet structure, thus yielding the target sheet structure 6d. The thus obtained sheet structure 6d has the same construction as the sheet structure shown in FIG. 1.

Figure 13:
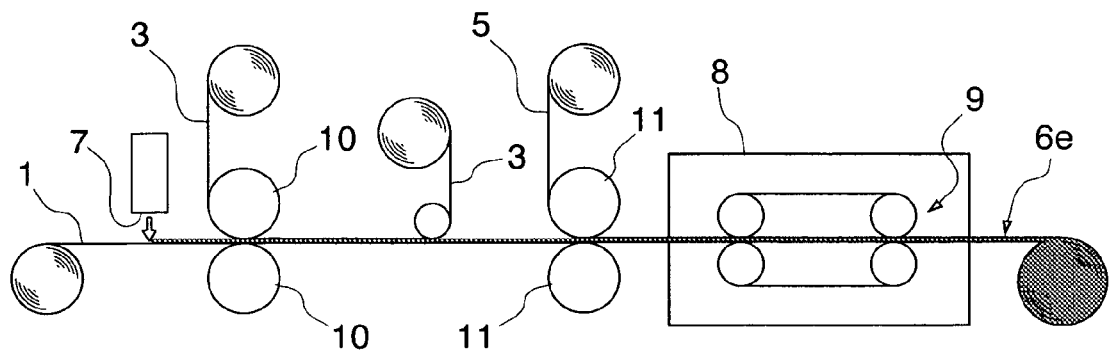
FIG. 13 is a schematic illustration showing a method of producing a polyurethane foam and a sheet structure containing a laminated sheet that uses such a foam according to an embodiment of the present invention.

FIG. 13 is a schematic illustration showing a method of producing a polyurethane foam sheet and a sheet structure containing a laminated sheet that uses such a foam sheet according to an embodiment of the present invention. In this production method, a liquid mixture (not shown in the figure) obtained by mixing together a heated and melted hot melt urethane prepolymer (A) containing isocyanate groups at the molecular terminals and a compound (B) containing at least 2 active hydrogen atom-containing groups with a mixing head 7, is poured onto a first releasable substrate 1. Subsequently, a second releasable substrate 3 is overlaid on top of the liquid mixture, thereby forming a first sheet structure, and this structure is then passed between a pair of application rollers 10 to form a sheet in which the thickness of the liquid mixture is uniform. The second releasable substrate 3 is then removed from this first sheet structure. Subsequently, a third substrate 5 is overlaid on top of the surface of the liquid mixture from which the second releasable substrate 3 has been removed, thus forming a second sheet structure, which is then passed through a pair of compression rollers 11. This second sheet structure is then passed through a belt press 9 positioned inside a high temperature steam humidification chamber 8, thus causing water foaming of the liquid mixture by bringing the sheet-like liquid mixture into contact with water vapor. This not only yields a polyurethane foam sheet (not shown in the figure), but also improves the thickness precision of the sheet structure, thus yielding the target sheet structure 6e.

Figure 14:
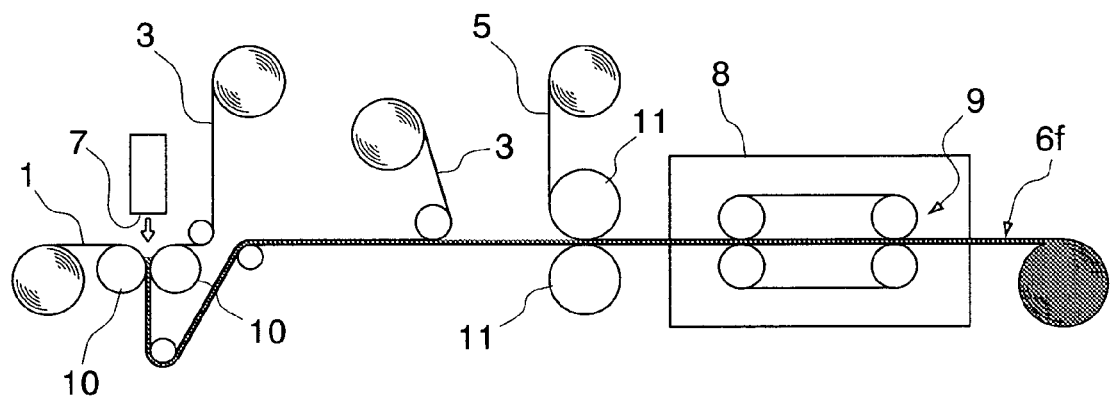
FIG. 14 is a schematic illustration showing a method of producing a polyurethane foam and a sheet structure containing a laminated sheet that uses such a foam according to an embodiment of the present invention.

FIG. 14 is a schematic illustration showing a method of producing a polyurethane foam sheet and a sheet structure containing a laminated sheet that uses such a foam sheet according to an embodiment of the present invention, with this figure showing another method of applying the liquid mixture of the present invention. In this production method, a liquid mixture (not shown in the figure) obtained by mixing together a heated and melted hot melt urethane prepolymer (A) containing isocyanate groups at the molecular terminals and a compound (B) containing at least 2 active hydrogen atom-containing groups with a mixing head 7, is poured between a first releasable substrate 1 and a second releasable substrate 3 to generate a first sheet structure, and this first sheet structure is then passed between a pair of application rollers 10 to form a sheet in which the thickness of the liquid mixture is uniform. Subsequently, the second releasable substrate 3 is removed from this first sheet structure. A third substrate 5 is then overlaid on top of the surface of the liquid mixture from which the second releasable substrate 3 has been removed, thus forming a second sheet structure, and this second sheet structure is then passed through a pair of compression rollers 11. Subsequently, the second sheet structure is passed through a belt press 9 positioned inside a high temperature steam humidification chamber 8, thus causing water foaming of the liquid mixture by bringing the sheet-like liquid mixture into contact with water vapor. This not only yields a polyurethane foam sheet (not shown in the figure), but also improves the thickness precision of the sheet structure, thus yielding the target sheet structure 6f.

Figure 15:
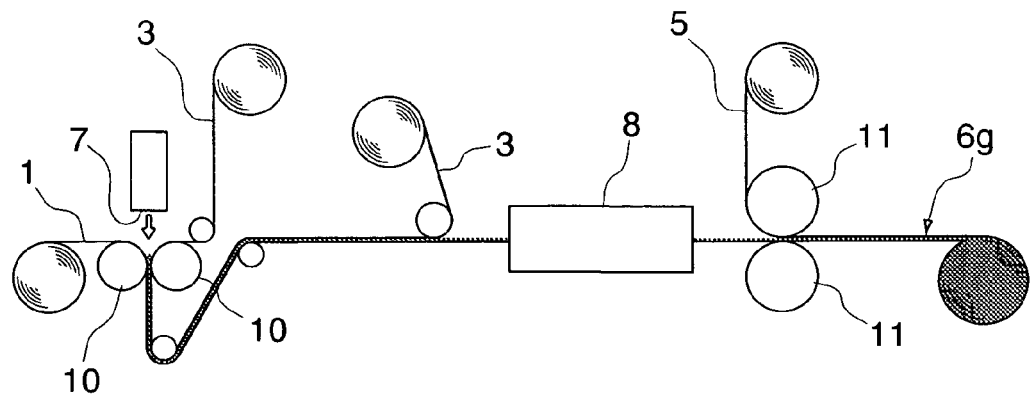
FIG. 15 is a schematic illustration showing a method of producing a polyurethane foam and a sheet structure containing a laminated sheet that uses such a foam according to an embodiment of the present invention.

FIG. 15 is a schematic illustration showing a method of producing a polyurethane foam sheet and a sheet structure containing a laminated sheet that uses such a foam sheet according to an embodiment of the present invention. In this production method, a liquid mixture (not shown in the figure) obtained by mixing together a heated and melted hot melt urethane prepolymer (A) containing isocyanate groups at the molecular terminals and a compound (B) containing at least 2 active hydrogen atom-containing groups with a mixing head 7, is poured between a first releasable substrate 1 and a second releasable substrate 3 to generate a first sheet structure, and this first sheet structure is then passed between a pair of application rollers 10 to form a sheet in which the thickness of the liquid mixture is uniform. Subsequently, the second releasable substrate 3 is removed from this first sheet structure. This first sheet structure is then passed through a high temperature steam humidification chamber 8 with the sheet-like liquid mixture exposed on top of the structure, thus causing water foaming of the liquid mixture by bringing the sheet-like liquid mixture into contact with water vapor, and yielding a polyurethane foam sheet (not shown in the figure). Subsequently, a third substrate 5 is overlaid on top of this polyurethane foam sheet to form a second sheet structure, and this second sheet structure is then passed through a pair of compression rollers 11, thus yielding the target sheet structure 6g.

EXAMPLES

As follows is a description of specifics of the present invention based on a series of examples, although the invention is in no way restricted to the examples presented below. In the following description, unless otherwise stated, the units "parts" and "%" refer to weight referenced values. The various properties of the resins were measured in accordance with the following methods.

[Method of Measuring Melt Viscosity]

The melt viscosity of the various hot melt urethane prepolymers obtained in the examples and comparative examples were measured using a cone-plate viscometer (manufactured by ICI Ltd.), at a measurement temperature of 125° C.

[Method of Measuring Foaming Degree]

For each of the liquid mixtures applied in a sheet-like manner in the examples and comparative examples, the ratio between the volume ($V_1$) of the liquid mixture prior to water foaming, and the volume ($V_2$) of the liquid mixture following water foaming caused by contact with water vapor or moisture (water), namely the ratio $V_2/V_1$, was measured, and the value of this ratio was used as the foaming degree.

Furthermore, in the comparative examples 1 and 4, mechanical foaming was conducted, and the liquid mixture was not brought into contact with water vapor or moisture (water). In these cases, the ratio between the volume ($V_1$) of the liquid mixture generated by mixing together the various raw materials using the blend proportions specified for the foam layer, and the volume ($V_2$) of the liquid mixture following mechanical foaming by blowing nitrogen gas through the liquid mixture with constant stirring, namely the ratio $V_2/V_1$, was measured, and the value of this ratio was used as the foaming degree.

[Method of Measuring the Collapsibility Under Stress Following Foaming]

For each of the foam sheets or laminated sheets produced in the examples and the comparative examples, following water foaming through contact with water vapor or moisture (water) (following application between sheets of release paper in the case of comparative example 1, following bonding to a laminated sheet III in the case of example 8, and following bonding to a urethane-impregnated nonwoven fabric in the case of comparative example 4), the sheet was left to stand for 30 minutes in an atmosphere at 23° C. and with a relative humidity of 65%. A 1 kg weight was then applied to a 5 cm ×5 cm square area of the sheet, and the collapsibility of the foam relative to stress was evaluated visually.

[Method of Measuring Tensile Characteristics of Foam Sheets]

Each of the foam sheets produced in the examples and the comparative examples was cut into test specimens of width 5 mm, and the tensile characteristics were measured in accordance with JIS K7311, using a Tensilon (manufactured by Shimadzu Corporation, H·S=300 mm/minute, wherein H·S is an abbreviation for "head speed". This abbreviation is also used below).

[Method of Measuring Heat Resistance of Foam Sheets]

Each of the foam sheets produced in the examples and the comparative example was subjected to a heat resistance test (held at 120° C. for 10 weeks), and the tensile characteristics were then remeasured in the same manner as described above.

[Method of Measuring the Resistance to Hydrolysis of Foam Sheets]

Each of the foam sheets produced in the examples and the comparative example was subjected to a hydrolysis resistance test (held at a temperature of 70° C. and a relative humidity of 95% for 10 weeks), and the tensile characteristics were then remeasured in the same manner as described above.

[Method of Measuring Interlayer Peel Strength for Foam Sheets]

Hot melt fabric tape of width 25 mm was heat sealed for 5 seconds at 130° C. to both surfaces of the foam sheet, and the interlayer peel strength of the foam sheet between the hot melt fabric tapes was then measured in accordance with JIS K6854-2 using a Tensilon (H·S=200 mm/minute).

[Method of Preparing Release Paper-Coated Outer Surface Film I]

A resin solution produced by mixing together a solvent-based polyurethane resin used for synthetic leather Crisvon NY324 (manufactured by Dainippon Ink and Chemicals, Incorporated, a polyurethane resin produced by reacting a polycarbonate-based polyol with a diisocyanate), a black pigment DILAC-6001 (manufactured by Dainippon Ink and Chemicals, Incorporated, carbon black), methyl ethyl ketone (MEK), and dimethylformamide (DMF) was applied uniformly to a release sheet using a knife coater in a quantity equivalent to 100 g/m$^2$, and the applied coating was then dried for 1 minute at 70° C. and then a further 2 minutes at 120° C., thus yielding a release paper-coated outer surface film I of thickness 30 µm.

[Method of Evaluating Adhesiveness of Laminated Sheets Containing a Foam Sheet]

Hot melt fabric tape was compressed and heat sealed for 5 seconds at 130° C. to the outer surface film I of the laminated sheet containing a foam sheet, and the adhesiveness was then evaluated by measuring the peel strength in accordance with JIS K6854-2, using a Tensilon (manufactured by Shimadzu Corporation) and a head speed of 200 mm/minute.

[Method of Evaluating the Resistance to Hydrolysis of Laminated Sheets Containing a Foam Sheet]

The laminated sheet containing a foam sheet was subjected to a hydrolysis resistance test (accelerated test conditions: held at a temperature of 70° C. and a relative humidity of 95% for 10 weeks), the peel strength was measured in the same manner as in the adhesiveness evaluation described above, any changes in the retention rate and the external appearance following evaluation were determined, and the hydrolysis resistance was evaluated in accordance with the following criteria.

O: No changes in external appearance following accelerated test

Δ: Localized changes in external appearance following accelerated test x: Changes in external appearance across the entire sheet following accelerated test

[Method of Evaluating Heat Resistance of Laminated Sheets Containing a Foam Sheet]

The laminated sheet containing a foam sheet was subjected to a heat resistance test (test conditions: held at 120° C. for 500 hours), the peel strength was measured in the same manner as in the adhesiveness evaluation described above, any changes in the retention rate and the external appearance following evaluation were determined, and the heat resistance was evaluated in accordance with the following criteria.

O: No changes in external appearance following heat resistance test

Δ: Localized changes in external appearance following heat resistance test x: Changes in external appearance across the entire sheet following heat resistance test

[Method of Preparing Release Paper-Coated Outer Surface Film I]

A resin solution produced by mixing together a solvent-based polyurethane resin used for synthetic leather Crisvon NY324 (manufactured by Dainippon Ink and Chemicals, Incorporated, a polyurethane resin produced by reacting a polycarbonate-based polyol with a diisocyanate), a black pigment DILAC-6001 (manufactured by Dainippon Ink and Chemicals, Incorporated, carbon black), methyl ethyl ketone (MEK), and dimethylformamide (DMF) was applied uniformly to a release sheet using a knife coater in a quantity equivalent to 100 g/m$^2$, and the applied coating was then dried for 1 minute at 70° C. and then a further 2 minutes at 120° C., thus yielding a release paper-coated outer surface film I of thickness 30 µm.

Example 1

Production of a Foam Sheet I

A 1 liter four neck flask was charged with 70 parts of a polytetramethylene glycol (hereafter abbreviated as PTMG) with a number average molecular weight of 1300, and 30 parts of a polyester polyol with a number average molecular weight of 2000, produced by reacting adipic acid (abbreviated as AA in Table 1) and hexanediol (abbreviated as HG in Table 1), and the mixture was heated under reduced pressure at 120° C., and dewatered until the moisture content had fallen to 0.05%. Following cooling to 60° C., 25 parts of 4,4'-diphenylmethane diisocyanate (MDI) was added, the temperature was raised to 110° C., and the mixture was reacted for 2 hours until the isocyanate group content became constant, thus yielding a urethane prepolymer I.

The melt viscosity of the urethane prepolymer I at 125° C. was 8000 mPa·s, and the isocyanate group content was 2.1% by weight. The urethane prepolymer I was heated to 120° C., and was then mixed with ethylene glycol (EG) and N,N-dimethylcyclohexylamine (hereafter abbreviated as DMCHA, brand name POLYCAT 8, manufactured by Air Products and Chemicals Inc.) in accordance with the blend proportions for the foam layer listed in Table 1, thus yielding a liquid mixture I.

The thus produced liquid mixture I was immediately introduced into the space between a first release paper and a second release paper set in a roll coater device, and following application of a sheet-like coating of the liquid mixture of thickness 50 µm, water vapor was spray misted onto both the first and second release papers for 1 minute, under conditions that included a temperature of 80° C. and a relative humidity of 95% in the vicinity of the surfaces of the release papers. The structure was then allowed to stand for 1 day in an atmosphere at 23° C. and a relative humidity of 65%, thus yielding a foam sheet I.

The results of evaluating the characteristics of the foam sheet I are shown in Table 1. The foam sheet I exhibited favorable foaming characteristics, with a foaming degree of 2.0, and also displayed excellent levels of heat resistance and resistance to hydrolysis. Furthermore, the sheet suffered no foam collapse under stress immediately following processing, which represents a very favorable result.

Example 2

Production of a Foam Sheet II

The liquid mixture I obtained in the example 1 was immediately introduced into the space between a first release paper and a second release paper set in a roll coater device, and following application of a sheet-like coating of the liquid mixture of thickness 100 µm, water vapor was spray misted onto both the first and second release papers for 1 minute, under conditions that included a temperature of 80° C. and a relative humidity of 95% in the vicinity of the surfaces of the release papers. The structure was then allowed to stand for 1 day in an atmosphere at 23° C. and a relative humidity of 65%, thus yielding a foam sheet II.

The results of evaluating the characteristics of the foam sheet II are shown in Table 1. The foam sheet II exhibited favorable foaming characteristics, with a foaming degree of 2.5, and also displayed excellent levels of heat resistance and resistance to hydrolysis. Furthermore, the sheet suffered no foam collapse under stress immediately following processing, which represents a very favorable result.

Example 3

Production of a Foam Sheet III

The liquid mixture I obtained in the example 1 was immediately introduced into the space between a first release paper and a second release paper set in a roll coater device, and following application of a sheet-like coating of the liquid mixture of thickness 300 µm, water vapor was spray misted onto both the first and second release papers for 1 minute, under conditions that included a temperature of 80° C. and a relative humidity of 95% in the vicinity of the surfaces of the release papers. The structure was then allowed to stand for 1 day in an atmosphere at 23° C. and a relative humidity of 65%, thus yielding a foam sheet III.

The results of evaluating the characteristics of the foam sheet III are shown in Table 1. The foam sheet III exhibited favorable foaming characteristics, with a foaming degree of 2.5, and also displayed excellent levels of heat resistance and resistance to hydrolysis. Furthermore, the sheet suffered no foam collapse under stress immediately following processing, which represents a very favorable result.

Example 4

Production of a Foam Sheet IV

The urethane prepolymer I obtained in the example 1 was heated to 120° C., and was then mixed with ethylene glycol (EG), the urethanization catalyst DMCHA, and a foam stabilizer SF2962 (manufactured by Dow Corning Toray Co., Ltd.), in accordance with the blend proportions for the foam layer listed in Table 1, thus yielding a liquid mixture II.

The thus obtained liquid mixture II was immediately introduced into the space between a first release paper and a second release paper set in a roll coater device, and following application of a sheet-like coating of the liquid mixture of thickness 100 µm, water vapor was spray misted onto both the first and second release papers for 1 minute, under conditions that included a temperature of 80° C. and a relative humidity of 95% in the vicinity of the surfaces of the release papers. The structure was then allowed to stand for 1 day in an atmosphere at 23° C. and a relative humidity of 65%, thus yielding a foam sheet IV.

The results of evaluating the characteristics of the foam sheet IV are shown in Table 1. The foam sheet IV exhibited favorable foaming characteristics, with a foaming degree of 2.5, and also displayed excellent levels of heat resistance and resistance to hydrolysis. Furthermore, the sheet suffered no foam collapse under stress immediately following processing, which represents a very favorable result.

Example 5

Production of a Foam Sheet V

The urethane prepolymer I obtained in the example 1 was heated to 120° C., and was then mixed with ethylene glycol (EG), water, the urethanization catalyst DMCHA, and the foam stabilizer SF2962 (manufactured by Dow Corning Toray Co., Ltd.), in accordance with the blend proportions for the foam layer listed in Table 2, thus yielding a liquid mixture III.

The thus obtained liquid mixture III was immediately introduced into the space between a first release paper and a second release paper set in a roll coater device, and following application of a sheet-like coating of the liquid mixture of thickness 100 µm, water vapor was spray misted onto both the first and second release papers for 1 minute, under conditions that included a temperature of 80° C. and a relative humidity of 95% in the vicinity of the surfaces of the release papers. The structure was then allowed to stand for 1 day in an atmosphere at 23° C. and a relative humidity of 65%, thus yielding a foam sheet V.

The results of evaluating the characteristics of the foam sheet V are shown in Table 2. The foam sheet V exhibited favorable foaming characteristics, with a foaming degree of 2.5, and also displayed excellent levels of heat resistance and resistance to hydrolysis. Furthermore, the sheet suffered no foam collapse under stress immediately following processing, which represents a very favorable result.

Comparative Example 1

Production of a Foam Sheet VI

The urethane prepolymer I obtained in the example 1 was heated to 120° C., and was then mixed with other raw materials in accordance with the blend proportions for the foam layer listed in Table 2. The mixture was then subjected to mechanical foaming by blowing nitrogen gas through the mixture with constant stirring, thus yielding a foamed liquid mixture I.

The thus obtained foamed liquid mixture I was immediately introduced into the space between a first release paper and a second release paper set in a roll coater device, and following application of a sheet-like coating of the liquid mixture of thickness 50 µm, no water vapor was spray misted onto the structure, but rather, the structure was simply allowed to stand for 1 day in an atmosphere at 23° C. and a relative humidity of 65%, thus yielding a foam sheet VI.

The results of evaluating the characteristics of the foam sheet VI are shown in Table 2. The foam sheet VI underwent almost no foaming and exhibited a foaming degree of 1.0, and also displayed poor levels of heat resistance and resistance to hydrolysis.

Comparative Example 2

Production of a Foam Sheet VII

A 1 liter four neck flask was charged with 100 parts of a polyester polyol with a number average molecular weight of 2000, produced by reacting adipic acid (abbreviated as AA in Table 2) and 3-methyl-1,5-pentanediol (abbreviated as 3MPD in Table 2), and the polyol was then heated under reduced pressure at 80° C., and dewatered until the moisture content had fallen to 0.05%. Following cooling to 60° C., 35 parts of Isonate 143L (manufactured by Dow Mitsubishi Chemical Ltd.) was added, the temperature was raised to 80° C., and the mixture was reacted for 1 hour until the isocyanate group content became constant, thus yielding a urethane prepolymer II.

The melt viscosity of the urethane prepolymer II at 125° C. was 100 mPa·s, and the isocyanate group content was 4.0% by weight, and at room temperature (atmospheric temperature 23° C.) the prepolymer was a fluid liquid.

Following heating to 80° C., 100 parts of the urethane prepolymer II was mixed with 6.0 parts of 2-pyrrolidone, in accordance with the blend proportions for the foam layer listed in Table 2, thus yielding a liquid mixture V.

The thus obtained liquid mixture V was immediately introduced into the space between a first release paper and a second release paper set in a roll coater device, and following application of a sheet-like coating of the liquid mixture of thickness 100 μm, water vapor was spray misted onto both the first and second release papers for 5 minutes, under conditions that included a temperature of 80° C. and a relative humidity of 95% in the vicinity of the surfaces of the release papers. The structure was then allowed to stand for 1 day in an atmosphere at 23° C. and a relative humidity of 65%, thus yielding a foam sheet VII.

The results of evaluating the characteristics of the foam sheet VII are shown in Table 2. The foam sheet VII underwent only limited foaming, exhibiting a foaming degree of 1.2, and also displayed preferable levels of heat resistance and resistance to hydrolysis.

Comparative Example 3

Production of a Foam Sheet VIII

The urethane prepolymer I obtained in the example 1 was heated to 120° C., and was then introduced into the space between a first release paper and a second release paper set in a roll coater device, and following application of a sheet-like coating of the prepolymer of thickness 100 μm, water vapor was spray misted onto both the first and second release papers for 5 minutes, under conditions that included a temperature of 80° C. and a relative humidity of 95% in the vicinity of the surfaces of the release papers. The structure was then allowed to stand for 1 day in an atmosphere at 23° C. and a relative humidity of 65%, thus yielding a foam sheet VIII.

The results of evaluating the characteristics of the foam sheet VIII are shown in Table 2. The foam sheet VIII underwent almost no foaming, and displayed poor foaming characteristics, with a foaming degree of only 1.1.

Example 6

Production of a Foam Sheet-Containing Laminated Sheet I

The urethane prepolymer I obtained in the example 1 was heated to 120° C., and was then mixed with other raw materials in accordance with the blend proportions for the foam layer listed in Table 3, thus yielding a liquid mixture. This liquid mixture was then introduced into the space between a release paper-coated outer surface film I and another release paper set in a roll coater device, in sufficient quantity to form a sheet-like coating of thickness 50 μm.

Following removal of the other release paper from the sheet structure, a urethane-impregnated nonwoven fabric was bonded to the surface of the sheet structure from which the other release paper had been removed. Water vapor was then spray misted onto both the release paper-coated outer surface film I and the urethane-impregnated nonwoven fabric for 1 minute, under conditions that included a temperature of 80° C. and a relative humidity of 95% in the vicinity of the surfaces of the sheet structure. The structure was then allowed to stand for 1 day in an atmosphere at 23° C. and a relative humidity of 65%, thus yielding a laminated sheet I.

The results of evaluating the characteristics of the laminated sheet I are shown in Table 3. The laminated sheet I exhibited favorable foaming characteristics, with a foaming degree of 2.0, and also displayed excellent levels of heat resistance and resistance to hydrolysis. Furthermore, the sheet suffered no foam collapse under stress immediately following processing, which represents a very favorable result.

Furthermore, a sample of the sheet structure was also taken prior to removal of the aforementioned other release paper, and samples of the different sheet structures were then cut into test specimens of width 25 mm, and the 180 degree peel strength was measured in accordance with JIS K6854-2, using a Tensilon (manufactured by Shimadzu Corporation, H·S=200 mm/minute). The results of these measurements revealed that the difference between the 180 degree peel strength between the release paper and the outer surface film in the release paper-coated outer surface film I, and the 180 degree peel strength between the aforementioned liquid mixture and the other release paper, was 2.0 N/25 mm.

Example 7

Production of a Foam Sheet-Containing Laminated Sheet II

The urethane prepolymer I obtained in the example I was heated to 120° C., and was then mixed with other raw materials in accordance with the blend proportions for the foam layer listed in Table 3, thus yielding a liquid mixture. This liquid mixture was then introduced into the space between a release paper-coated outer surface film I and another release paper set in a roll coater device, in sufficient quantity to form a sheet-like coating of thickness 100 μm.

Following removal of the other release paper from the sheet structure, a urethane-impregnated nonwoven fabric was bonded to the surface of the sheet structure from which the other release paper had been removed. Water vapor was then spray misted onto both the release paper-coated outer surface film I and the urethane-impregnated nonwoven fabric for 1 minute, under conditions that included a temperature of 80° C. and a relative humidity of 95% in the vicinity of the surfaces of the sheet structure. The structure was then allowed to stand for 1 day in an atmosphere at 23° C. and a relative humidity of 65%, thus yielding a laminated sheet II.

The results of evaluating the characteristics of the laminated sheet II are shown in Table 3. The laminated sheet II exhibited favorable foaming characteristics, with a foaming degree of 2.2, and also displayed excellent levels of heat resistance and resistance to hydrolysis. Furthermore, the sheet suffered no foam collapse under stress immediately following processing, which represents a very favorable result.

Furthermore, a sample of the sheet structure was also taken prior to removal of the aforementioned other release paper, and samples of the different sheet structures were then cut into test specimens of width 25 mm, and the 180 degree peel strength was measured in accordance with JIS K6854-2, using a Tensilon (manufactured by Shimadzu Corporation, H·S=200 mm/minute). The results of these measurements revealed that the difference between the 180 degree peel strength between the release paper and the outer surface film in the release paper-coated outer surface film I, and the 180 degree peel strength between the aforementioned liquid mixture and the other release paper, was 2.0 N/25 mm.

Example 8

Production of Foam Sheet-Containing Laminated Sheets III and IV

The urethane prepolymer I obtained in the example 1 was heated to 120° C., and was then mixed with other raw materials in accordance with the blend proportions for the foam layer listed in Table 3, thus yielding a liquid mixture. This liquid mixture was then introduced into the space between a first release paper and a second release paper set in a roll coater device, in sufficient quantity to form a sheet-like coating of thickness 100 μm.

Following removal of the second release paper from the sheet structure, a urethane-impregnated nonwoven fabric was bonded to the surface of the sheet structure from which the second release paper had been removed. Water vapor was then spray misted onto both the first release paper and the urethane-impregnated nonwoven fabric for 1 minute, under conditions that included a temperature of 80° C. and a relative humidity of 95% in the vicinity of the surfaces of the sheet structure. The structure was then allowed to stand for 1 day in an atmosphere at 23° C. and a relative humidity of 65%, and the first release paper was then also removed, thus yielding a foam sheet-containing laminated sheet III.

Subsequently, a resin solution produced by mixing together a solvent-based urethane resin used for bonding synthetic leather Crisvon TA265 (manufactured by Dainippon Ink and Chemicals, Incorporated), Crisvon NX (manufactured by Dainippon Ink and Chemicals, Incorporated), Crisvon Accel HM (manufactured by Dainippon Ink and Chemicals, Incorporated), toluene (TOL), and dimethylformamide (DMF) was applied uniformly to the outer surface coating film of the release paper-coated outer surface film using a knife coater, in a quantity equivalent to 100 g/m². The applied coating was then dried for 1 minute at 70° C. and then a further 2 minutes at 120° C., and then bonded to the foam sheet surface of the laminated sheet III, thus yielding a laminated sheet IV.

The results of evaluating the characteristics of the laminated sheet IV are shown in Table 3. The laminated sheet IV exhibited favorable foaming characteristics, with a foaming degree of 2.2, and also displayed excellent levels of heat resistance and resistance to hydrolysis. Furthermore, the sheet suffered no foam collapse under stress immediately following processing, which represents a very favorable result.

Furthermore, during the production of the laminated sheet III, a sample of the sheet structure was also taken prior to removal of the second release paper, and samples of the different sheet structures were then cut into test specimens of width 25 mm, and the 180 degree peel strength was measured in accordance with JIS K6854-2, using a Tensilon (manufactured by Shimadzu Corporation, H·S=200 mm/minute). The results of these measurements revealed that the difference between the 180 degree peel strength between the release paper and the outer surface film in the release paper-coated outer surface film I, and the 180 degree peel strength between the aforementioned liquid mixture and the other release paper, was 2.0 N/25 mm.

Comparative Example 4

Production of a Foam Sheet-Containing Laminated Sheet V

The urethane prepolymer I obtained in the example 1 was heated to 120° C., and was then mixed with other raw materials in accordance with the blend proportions for the foam layer listed in Table 3, and the resulting mixture was then subjected to mechanical foaming by blowing nitrogen gas through the mixture with constant stirring, thus yielding a mechanically foamed liquid mixture. This foamed liquid mixture was then introduced into the space between a release paper-coated outer surface film I and another release paper set in a roll coater device, in sufficient quantity to form a sheet-like coating of thickness 100 μm.

Following removal of the other release paper from the sheet structure, a urethane-impregnated nonwoven fabric was bonded to the surface of the sheet structure from which the other release paper had been removed, and the resulting structure was then allowed to stand for 1 day in an atmosphere at 23° C. and a relative humidity of 65%, thus yielding a laminated sheet V.

The results of evaluating the characteristics of the laminated sheet V are shown in Table 3. The laminated sheet V had a foaming degree of 1.5, but the uneven pattern of the release paper had run, causing a deterioration in the external appearance. Furthermore, the heat resistance and resistance to hydrolysis were also inferior.

Furthermore, a sample of the sheet structure was also taken prior to removal of the aforementioned other release paper, and samples of the different sheet structures were then cut into test specimens of width 25 mm, and the 180 degree peel strength was measured in accordance with JIS K6854-2, using a Tensilon (manufactured by Shimadzu Corporation, H·S=200 mm/minute). The results of these measurements revealed that the difference between the 180 degree peel strength between the release paper and the outer surface film in the release paper-coated outer surface film I, and the 180 degree peel strength between the aforementioned liquid mixture and the other release paper, was 2.0 N/25 mm.

TABLE 1

|  | Example 1 | Example 2 | Example 3 | Example 4 |
|---|---|---|---|---|
| Prepolymer composition (parts by weight) | | | | |
| PTMG1300 | 70 | 70 | 70 | 70 |
| HG/AA (polyester polyol 2000) | 30 | 30 | 30 | 30 |
| 4,4'-diphenylmethane diisocyanate | 25 | 25 | 25 | 25 |
| Results of evaluating prepolymer properties | | | | |
| Melt viscosity (mPa · s/125° C.) | 8000 | 8000 | 8000 | 8000 |
| Isocyanate group content (% by weight) | 2.1 | 2.1 | 2.1 | 2.1 |
| Foam layer composition <parts by weight per 100 parts by weight of prepolymer> | Water vapor mist spray | Water vapor mist spray | Water vapor mist spray | Water vapor mist spray |
| (B) ethylene glycol (EG) | 0.50 | 0.50 | 0.50 | 0.50 |
| (C) DMCHA | 0.10 | 0.10 | 0.10 | 0.10 |
| (D) foam stabilizer (SF2962) | | | | 0.10 |
| Results of evaluating foam sheet properties | Sheet I | Sheet II | Sheet III | Sheet IV |
| (1) coating thickness (μm) | 50 | 100 | 300 | 100 |
| (2) foaming characteristics; foam ratio ($V_2/V_1$) | 2.0 | 2.5 | 2.5 | 2.5 |
| (3) foam collapsibility under stress | ◯ | ◯ | ◯ | ◯ |

TABLE 1-continued

|  | Example 1 | Example 2 | Example 3 | Example 4 |
|---|---|---|---|---|
| (4) Tensile characteristics |  |  |  |  |
| tensile strength (MPa) | 1.00 | 3.00 | 8.00 | 2.95 |
| elongation at breaking point (%) | 700 | 710 | 720 | 710 |
| 50% modulus (MPa) | 0.35 | 0.80 | 1.50 | 0.80 |
| 100% modulus (MPa) | 0.55 | 1.50 | 2.00 | 1.45 |
| (5) Heat resistance |  |  |  |  |
| tensile strength (MPa) | 0.98 | 2.80 | 7.80 | 2.80 |
| elongation at breaking point (%) | 710 | 710 | 720 | 710 |
| 50% modulus (MPa) | 0.34 | 0.80 | 1.45 | 0.80 |
| 100% modulus (MPa) | 0.54 | 1.45 | 1.85 | 1.40 |
| (6) Hydrolysis resistance |  |  |  |  |
| tensile strength (MPa) | 0.75 | 2.50 | 7.80 | 2.45 |
| elongation at breaking point (%) | 765 | 710 | 720 | 710 |
| 50% modulus (MPa) | 0.35 | 0.80 | 1.45 | 0.80 |
| 100% modulus (MPa) | 0.55 | 1.40 | 1.85 | 1.40 |
| (7) Interlayer peel strength (N/25 mm) | 0.4 | 0.4 | 0.4 | 0.4 |

(Notes)
Compound names recorded in abbreviated form in the table are as follows:
PTMG: polytetramethylene glycol
HG: hexanediol
AA: adipic acid
DMCHA: N,N-dimethylcyclohexylamine

TABLE 2

|  | Example 5 | Comparative Example 1 | Comparative Example 2 | Comparative Example 3 |
|---|---|---|---|---|
| Prepolymer composition (parts by weight) |  |  |  |  |
| PTMG1300 | 70 | 70 |  | 70 |
| HG/AA (polyester polyol 2000) | 30 | 30 |  | 30 |
| 4,4'-diphenylmethane diisocyanate | 25 | 25 |  | 25 |
| dibutyltin dilaurate (DBSNDL) |  |  |  |  |
| 3MPD/AA (polyester polyol 2000) |  |  | 100 |  |
| Isonate 143L |  |  | 35 |  |
| Results of evaluating prepolymer properties |  |  |  |  |
| Melt viscosity (mPa · s/125° C.) | 8000 | 8000 | 100 | 8000 |
| Isocyanate group content (% by weight) | 2.1 | 2.1 | 4.0 | 2.1 |
| Foam layer composition <parts by weight per 100 parts by weight of prepolymer> | Water vapor mist spray | Water vapor mist spray | Water vapor mist spray | Water vapor mist spray |
| (B) ethylene glycol (EG) | 0.50 | 0.50 |  |  |
| Water | 0.05 |  |  |  |
| (C) DMCHA | 0.10 | 0.10 |  |  |
| (D) foam stabilizer (SF2962) | 0.10 |  |  |  |
| (E) 2-pyrrolidone |  |  | 6.0 |  |
| Results of evaluating foam sheet properties | Sheet V | Sheet VI | Sheet VII | Sheet VIII |
| (1) coating thickness (μm) | 100 | 50 | 100 | 100 |
| (2) foaming characteristics; foam ratio ($V_2/V_1$) | 2.5 | 1.0 | 1.2 | 1.1 |
| (3) foam collapsibility under stress | ○ | — | — | — |
| (4) Tensile characteristics |  |  |  |  |
| tensile strength (MPa) | 3.30 | 1.00 | 10.0 | 12.0 |
| elongation at breaking point (%) | 690 | 700 | 600 | 680 |
| 50% modulus (MPa) | 0.90 | 0.35 | 0.50 | 3.50 |
| 100% modulus (MPa) | 1.60 | 0.55 | 0.80 | 5.00 |
| (5) Heat resistance |  |  |  |  |
| tensile strength (MPa) | 3.00 | 0.20 | 8.0 | 12.0 |
| elongation at breaking point (%) | 690 | 200 | 500 | 680 |
| 50% modulus (MPa) | 0.89 | 0.05 | 0.50 | 3.50 |
| 100% modulus (MPa) | 1.58 | 0.05 | 0.80 | 5.00 |
| (6) Hydrolysis resistance |  |  |  |  |
| tensile strength (MPa) | 2.82 | 0.15 | 8.0 | 12.0 |
| elongation at breaking point (%) | 690 | 150 | 500 | 680 |

TABLE 2-continued

|  | Example 5 | Comparative Example 1 | Comparative Example 2 | Comparative Example 3 |
|---|---|---|---|---|
| 50% modulus (MPa) | 0.87 | 0.03 | 0.50 | 3.50 |
| 100% modulus (MPa) | 1.47 | 0.05 | 0.80 | 5.50 |
| (7) Interlayer peel strength (N/25 mm) | 0.4 | 0.1 | 0.4 | 0.7 |

(Notes)
Compound names recorded in abbreviated form in the table are as follows:
PTMG: polytetramethylene glycol
HG: hexanediol
AA: adipic acid
3MPD: 3-methyl-1,5-pentanediol
DMCHA: N,N-dimethylcyclohexylamine
Isonate 143L: a mixture of diphenylmethane diisocyanate and a carbodiimide derivative of diphenylmethane diisocyanate

TABLE 3

|  | Example 6 | Example 7 | Example 8 | Comparative Example 4 |
|---|---|---|---|---|
| Prepolymer composition (parts by weight) | | | | |
| PTMG1300 | 70 | 70 | 70 | 70 |
| HG/AA (polyester polyol 2000) | 30 | 30 | 30 | 30 |
| 4,4'-diphenylmethane diisocyanate | 25 | 25 | 25 | 25 |
| Results of evaluating prepolymer properties | | | | |
| Melt viscosity (mPa·s/125° C.) | 8000 | 8000 | 8000 | 8000 |
| Isocyanate group content (% by weight) | 2.1 | 2.1 | 2.1 | 2.1 |
| Foam layer composition <parts by weight per 100 parts by weight of prepolymer> | Water vapor mist spray | Water vapor mist spray | Water vapor mist spray | Water vapor mist spray |
| (B) ethylene glycol (EG) | 0.50 | 0.50 | 0.50 | 0.50 |
| (C) DMCHA | 0.10 | 0.10 | 0.10 | 0.10 |
| (D) foam stabilizer (SF2962) | 0.10 | 0.10 | 0.10 | 0.10 |
| Results of evaluating laminated sheet properties | Laminated sheet I | Laminated sheet II | Laminated sheets III, IV | Laminated sheet V |
| (1) coating thickness (μm) | 50 | 100 | 100 | 100 |
| (2) foaming characteristics; foam ratio ($V_2/V_1$) | 2.0 | 2.2 | 2.2 | 1.5 |
| (3) foam collapsibility under stress | ○ | ○ | ○ | X |
| Results of evaluating adhesion characteristics of laminated sheets | | | | |
| (4) original peel strength (N/25 mm) | 0.86 | 0.89 | 0.87 | 1.00 |
| (5) peel strength following heat resistance test (N/25 mm) | 0.85 | 0.87 | 0.84 | 0.50 |
| Changes in external appearance | ○ | ○ | ○ | X |
| (6) peel strength following hydrolysis resistance test (N/25 mm) | 0.86 | 0.85 | 0.85 | 0.50 |
| Changes in external appearance | ○ | ○ | ○ | X |
| (7) Difference in 180 degree peel strength values for release paper (N/25 mm) | 2.0 | 2.0 | 2.0 | 2.0 |

(Notes)
Compound names recorded in abbreviated form in the table are as follows:
PTMG: polytetramethylene glycol
HG: hexanediol
AA: adipic acid
DMCHA: N,N-dimethylcyclohexylamine

INDUSTRIAL APPLICABILITY

According to the present invention, a production method can be provided which enables the production of a polyurethane foam sheet, and a laminated sheet that uses such a polyurethane foam sheet, wherein easy control of the foam shape is possible even in the case of a comparatively thin foam sheet, and a polyurethane foam sheet with uniform foam shape, a soft texture, good flexibility, and excellent mechanical strength and durability such as resistance to hydrolysis and heat can be produced continuously and efficiently.

Furthermore, the cross-linking reaction of the isocyanate groups within the hot melt urethane prepolymer (A) proceeds rapidly, meaning the foamed shape is stabilized within a relatively short time, and as a result, when the produced polyurethane foam sheet, or a laminated sheet produced using the polyurethane foam sheet, is wound into a roll or the like, the problem wherein stress applied to the sheet can cause deformation or even collapse of the foam shape does not arise.

In addition, the present invention uses no organic solvents, meaning the solvent drying and extraction steps that are essential for conventional solvent-based adhesives are no longer required, thus enabling significant improvements in problem areas such as the deleterious impact on human health, environmental contamination, and the energy and equipment costs associated with evaporating organic solvents.

The invention claimed is:

1. A method of producing a polyurethane foam sheet, comprising the steps of applying a liquid mixture, obtained by mixing together a heated and melted hot melt urethane prepolymer (A), with a number average molecular weight within a range of 1,000 to 10,000 and containing isocyanate groups at molecular terminals, and a diol (B), onto a substrate in a sheet-like manner, and water foaming said liquid mixture by bringing said sheet-like liquid mixture into contact with water vapor by spray misting, wherein a ratio of a weight equivalence of active hydrogen atom-containing groups within said diol (B), relative to a weight equivalence of isocyanate groups within said hot melt urethane prepolymer (A) [isocyanate group equivalence/active hydrogen atom-containing group equivalence], is within a range of 1.5 to 20.0, the atmospheric temperature at the surface of the sheet-like liquid mixture is set to a temperature within a range of 40 to 120° C. the atmospheric humidity is set to at least 60%, and the humidification time period is set to a value within a range of 0.5 seconds to 10 minutes, and the foaming degree of the polyurethane foam sheet is within a range of 1.5 to 3.0.

2. The method of producing a polyurethane foam sheet according to claim 1, wherein said liquid mixture is produced by mixing together said heated and melted hot melt urethane prepolymer (A), said diol (B), and a urethanization catalyst (C).

3. The method of producing a polyurethane foam sheet according to claim 1, wherein said hot melt urethane prepolymer (A) is a hot melt urethane prepolymer (a-2) that also contains hydrolysable alkoxysilyl groups.

4. The method of producing a polyurethane foam sheet according to claim 1, wherein an isocyanate group content within said hot melt urethane prepolymer (A) is within a range of 0.5 to 10.0% by weight.

5. The method of producing a polyurethane foam sheet according to claim 1, wherein said hot melt urethane prepolymer (A) has a melt viscosity, measured at 125° C. using a cone-plate viscometer, within a range of 100 to 100,000 mPa·s.

6. A method of producing a polyurethane foam sheet, comprising the steps of introducing a liquid mixture, obtained by mixing together a heated and melted hot melt urethane prepolymer (A), with a number average molecular weight within a range of 1,000 to 10,000 and containing isocyanate groups at molecular terminals, and a diol (B), into a space between a first releasable substrate and a second releasable substrate to form a sheet-like product in a continuous manner, and water foaming said sheet-like product sandwiched between said first releasable substrate and said second releasable substrate by bringing either one surface or both surfaces of said releasable substrates into contact with water vapor by spray misting, wherein a ratio of a weight equivalence of active hydrogen atom-containing groups within said diol (B), relative to a weight equivalence of isocyanate groups within said hot melt urethane prepolymer (A) [isocyanate group equivalence/active hydrogen atom-containing group equivalence], is within a range of 1.5 to 20.0, the atmospheric temperature at the surface of the sheet-like liquid mixture is set to a temperature within a range of 40 to 120° C. the atmospheric humidity is set to at least 60%, and the humidification time period is set to a value within a range of 0.5 seconds to 10 minutes, and the foaming degree of the polyurethane foam sheet is within a range of 1.5 to 3.0.

7. The method of producing a polyurethane foam sheet according to claim 6, wherein said liquid mixture is produced by mixing together said heated and melted hot melt urethane prepolymer (A), said diol (B), and a urethanization catalyst (C).

8. The method of producing a polyurethane foam sheet according to claim 6, wherein said hot melt urethane prepolymer (A) is a hot melt urethane prepolymer (a-2) that also contains hydrolysable alkoxysilyl groups.

9. The method of producing a polyurethane foam sheet according to claim 6, wherein an isocyanate group content within said hot melt urethane prepolymer (A) is within a range of 0.5 to 10.0% by weight.

10. The method of producing a polyurethane foam sheet according to claim 6, wherein said hot melt urethane prepolymer (A) has a melt viscosity, measured at 125° C. using a cone-plate viscometer, within a range of 100 to 100,000 mPa·s.

11. A method of producing a polyurethane foam sheet, comprising the steps of introducing a liquid mixture, obtained by mixing together a heated and melted hot melt urethane prepolymer (A), with a number of average molecular weight within a range of 1,000 to 10,000 and containing isocyanate groups at molecular terminals, and a diol (B), into a space between a first releasable substrate and a second releasable substrate to form a sheet-like product in a continuous manner, removing one of said first releasable substrate and said second releasable substrate, and water foaming said sheet-like product by bringing said sheet-like product into direct contact with water vapor by spray misting, wherein a ratio of a weight equivalence of active hydrogen atom-containing groups within said diol (B), relative to a weight equivalence of isocyanate groups within said hot melt urethane prepolymer (A) [isocyanate group equivalence/active hydrogen atom-containing group equivalence], is within a range of 1.5 to 20.0, the atmospheric temperature at the surface of the sheet-like liquid mixture is set to a temperature within a range of 40 to 120° C. the atmospheric humidity is set to at least 60%, and the humidification time period is set to a value within a range of 0.5 seconds to 10 minutes, and the foaming degree of the polyurethane foam sheet is within a range of 1.5 to 3.0.

12. The method of producing a polyurethane foam sheet according to claim 11, wherein said liquid mixture is produced by mixing together said heated and melted hot melt urethane prepolymer (A), said diol (B), and a urethanization catalyst (C).

13. The method of producing a polyurethane foam sheet according to claim 11, wherein said hot melt urethane prepolymer (A) is a hot melt urethane prepolymer (a-2) that also contains hydrolysable alkoxysilyl groups.

14. The method of producing a polyurethane foam sheet according to claim 11, wherein an isocyanate group content within said hot melt urethane prepolymer (A) is within a range of 0.5 to 10.0% by weight.

15. The method of producing a polyurethane foam sheet according to claim 11, wherein said hot melt urethane prepolymer (A) has a melt viscosity, measured at 125° C. using a cone-plate viscometer, within a range of 100 to 100,000 mPa·s.

16. A method of producing a laminated sheet, comprising the steps of applying a liquid mixture, obtained by mixing together a heated and melted hot melt urethane prepolymer (A), with a number average molecular weight within a range of 1,000 to 10,000 and containing isocyanate groups at molecular terminals, and a diol (B), onto a substrate in a sheet-like manner, water foaming said liquid mixture by bringing said sheet-like liquid mixture into contact with water vapor by spray misting to form a polyurethane foam sheet, and bonding a third substrate onto said polyurethane foam sheet, wherein
- a ratio of a weight equivalence of active hydrogen atom-containing groups within said diol (B), relative to a weight equivalence of isocyanate groups within said hot melt urethane prepolymer (A) [isocyanate group equivalence/active hydrogen atom-containing group equivalence], is within a range of 1.5 to 20.0,
- the atmospheric temperature at the surface of the sheet-like liquid mixture is set to a temperature within a range of 40 to 120° C. the atmospheric humidity is set to at least 60%, and the humidification time period is set to a value within a range of 0.5 seconds to 10 minutes, and
- the foaming degree of the polyurethane foam sheet is within a range of 1.5 to 3.0.

17. A method of producing a laminated sheet, comprising the steps of applying a liquid mixture, obtained by mixing together a heated and melted hot melt urethane prepolymer (A), with a number average molecular weight within a range of 1,000 to 10,000 and containing isocyanate groups at molecular terminals, and a diol (B), into a space between a first resealable substrate and a second releasable substrate to form a sheet-like product in a continuous manner, removing one of said first releasable substrate and said second relaseable substrate, water foaming said sheet-like product by bringing an exposed surface of said sheet-like product, and/or a remaining first or second releasable substrate, into contact with water vapor by spray misting to form a polyurethane form sheet, and bonding a third substrate to said exposed surface of said polyurethane foam sheet from which said first or second releasable substrate has been removed, wherein
- a ratio of a weight equivalence of active hydrogen atom-containing groups within said diol (B), relative to a weight equivalence of isocyanate groups within said hot melt urethane prepolymer (A) [isocyanate group equivalence/active hydrogen atom-containing group equivalence], is within a range of 1.5 to 20.0
- the atmospheric temperature at the surface of the sheet-like liquid mixture is set to a temperature within a range of 40 to 120° C. the atmospheric humidity is set to at least 60%, and the humidification time period is set to a value within a range of 0.5 seconds to 10 minutes, and
- the foaming degree of the polyurethane foam sheet is within a range of 1.5 to 3.0.

18. The method of producing a laminated sheet according to claim 16, wherein said hot melt urethane prepolymer (A) is a hot melt urethane prepolymer (a-2) that also contains hydrolysable alkoxysilyl groups.

19. The method of producing a laminated sheet according to claim 16, wherein an isocyanate group content within said hot melt urethane prepolymer (A) is within a range of 0.5 to 10% by weight.

20. The method of producing a laminated sheet according to claim 16, wherein the laminated sheet is used as a synthetic leather.

21. A method of producing a laminated sheet, comprising the steps of applying a liquid mixture, obtained by mixing together a heated and melted hot melt urethane prepolymer (A), with a number average molecular weight within a range of 1,000 to 10,000 and containing isocyanate groups at molecular terminals, and a diol (B), onto a substrate in a sheet-like manner, bonding a third substrate onto said sheet-like liquid mixture to form a laminate, and water foaming said liquid mixture by bringing said laminate into contact with water vapor by spray misting, wherein
- a ratio of a weight equivalence of active hydrogen atom-containing groups within said diol (B), relative to a weight equivalence of isocyanate groups within said hot melt urethane prepolymer (A) [isocyanate group equivalence/active hydrogen atom-containing group equivalence], is within a range of 1.5 to 20.0,
- the atmospheric temperature at the surface of the sheet-like liquid mixture is set to a temperature within a range of 40 to 120° C. the atmospheric humidity is set to at least 60%, and the humidification time period is set to a value within a range of 0.5 seconds to 10 minutes, and
- the foaming degree of the polyurethane foam sheet is within a range of 1.5 to 3.0.

22. The method of producing a laminated sheet according to claim 21, wherein said liquid mixture is produced by mixing together said heated and melted hot melt urethane prepolymer (A), said diol (B), and a urethanization catalyst (C).

23. The method of producing a laminated sheet according to claim 21, wherein said hot melt urethane prepolymer (A) is a hot melt urethane prepolymer (a-2) that also contains hydrolysable alkoxysilyl groups.

24. The method of producing a laminated sheet according to claim 21, wherein groups an isocyanate group content within said hot melt urethane prepolymer (A) is within a range of 0.5 to 10% by weight.

25. The method of producing a laminated sheet according to claim 21, wherein the laminated sheet is used as a synthetic leather.

26. The method of producing a laminated sheet according to claim 16, wherein said liquid mixture is produced by mixing together said heated and melted hot melt urethane prepolymer (A), said diol (B), and a urethanization catalyst (C).

27. The method of producing a laminated sheet according to claim 17, wherein said liquid mixture is produced by mixing together said heated and melted hot melt urethane prepolymer (A), said diol (B), and a urethanization catalyst (C).

28. The method of producing a laminated sheet according to claim 17, wherein said hot melt urethane prepolymer (A) is a hot melt urethane prepolymer (a-2) that also contains hydrolysable alkoxysilyl groups.

29. The method of producing a laminated sheet according to claim 17, wherein groups an isocyanate group content within said hot melt urethane prepolymer (A) is within a range of 0.5 to 10% by weight.

30. The method of producing a laminated sheet according to claim 17, wherein the laminated sheet is used as a synthetic leather.

* * * * *